(12) United States Patent
Hwang et al.

(10) Patent No.: US 12,471,088 B2
(45) Date of Patent: Nov. 11, 2025

(54) METHOD AND DEVICE FOR PERFORMING SIDELINK COMMUNICATION ON BASIS OF SIDELINK HARQ FEEDBACK INFORMATION IN NR V2X

(71) Applicant: LG ELECTRONICS INC., Seoul (KR)

(72) Inventors: Daesung Hwang, Seoul (KR); Seungmin Lee, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 575 days.

(21) Appl. No.: 17/758,924

(22) PCT Filed: Jan. 18, 2021

(86) PCT No.: PCT/KR2021/000660
§ 371 (c)(1),
(2) Date: Jul. 15, 2022

(87) PCT Pub. No.: WO2021/145745
PCT Pub. Date: Jul. 22, 2021

(65) Prior Publication Data
US 2023/0055280 A1    Feb. 23, 2023

(30) Foreign Application Priority Data

Jan. 17, 2020  (KR) .................. 10-2020-0006607
Jan. 17, 2020  (KR) .................. 10-2020-0006653
(Continued)

(51) Int. Cl.
*H04W 72/20* (2023.01)
*H04L 1/1812* (2023.01)
*H04W 72/0446* (2023.01)

(52) U.S. Cl.
CPC .......... *H04W 72/20* (2023.01); *H04L 1/1812* (2013.01); *H04W 72/0446* (2013.01)

(58) Field of Classification Search
CPC .. H04W 72/20; H04W 72/0446; H04L 1/1812
See application file for complete search history.

(56) References Cited

U.S. PATENT DOCUMENTS

2016/0219443 A1*   7/2016   Lee .................. H04W 74/006
2022/0272726 A1*   8/2022   Wang ................ H04L 1/1812
(Continued)

FOREIGN PATENT DOCUMENTS

CN    112399644 A   *   2/2021   ............ H04W 72/23
KR    2015-0015295         2/2015

OTHER PUBLICATIONS

Intel Corporation "Sidelink physical structure for NR V2X communication", R1-1913255, 3GPP TSG RAN WG1 Meeting #99, Nov. 18-22, 2019 (Year: 2019).*
(Continued)

*Primary Examiner* — Huy D Vu
*Assistant Examiner* — Robert Ma
(74) *Attorney, Agent, or Firm* — LEE, HONG, DEGERMAN, KANG & WAIMEY

(57) ABSTRACT

A method in which a first device performs sidelink communication is provided according to one embodiment of the present disclosure. For example, a method in which a first device operates a first timer and/or a second timer on the basis of sidelink HARQ feedback information may be provided.

13 Claims, 28 Drawing Sheets

(30) Foreign Application Priority Data

Jan. 17, 2020 (KR) .......................... 10-2020-0006659
Mar. 19, 2020 (KR) .......................... 10-2020-0033798

(56) References Cited

U.S. PATENT DOCUMENTS

2022/0321306 A1* 10/2022 Wang .................... H04L 1/1864
2022/0360374 A1* 11/2022 Yoshioka .............. H04L 5/0094

OTHER PUBLICATIONS

PCT International Application No. PCT/KR2021/000660, International Search Report dated Apr. 5, 2021, 4 pages.
Intel Corporation, "Sidelink physical structure for NR V2X communication," R1-1913255, 3GPP TSG RAN WG1 Meeting #99, Nov. 2019, 37 pages.
LG Electronics, "Discussion on physical layer procedures for NR sidelink, " R1-1913237, 3GPP TSG RAN WG1 Meeting #99, Nov. 2019, 22 pages.
Samsung, "On physical layer structures for NR V2X," R1-1912458, 3GPP TSG RAN WG1 #99 Meeting, Nov. 2019, 14 pages.

* cited by examiner

METHOD AND DEVICE FOR PERFORMING SIDELINK COMMUNICATION ON BASIS OF SIDELINK HARQ FEEDBACK INFORMATION IN NR V2X

CROSS-REFERENCE TO RELATED APPLICATIONS

This application is the National Stage filing under 35 U.S.C. 371 of International Application No. PCT/KR2021/000660, filed on Jan. 18, 2021, which claims the benefit of earlier filing date and right of priority to Korean Application Nos. 10-2020-0006607, filed on Jan. 17, 2020, 10-2020-0006653, filed on Jan. 17, 2020, 10-2020-0006659, filed on Jan. 17, 2020, and 10-2020-0033798, filed on Mar. 19, 2020, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

An object of the present disclosure is to provide a sidelink (SL) communication method between devices (or UEs) and an apparatus (or UE) for performing the same.

Another technical problem of the present disclosure is to provide a method for performing sidelink communication based on sidelink Hybrid Automatic Repeat Request (HARQ) feedback information in NR V2X and a device (or UE) for performing the same.

Another technical problem of the present disclosure is to provide a method of operating a sidelink HARQ timer based on sidelink HARQ feedback information in NR V2X and a device (or UE) for performing the same.

Another technical problem of the present disclosure is that, for the purpose of saving power consumption, a UE may only expect a reception of a PSCCH within a sensing window, and may not expect a reception of a PSSCH.

Technical Solutions

According to an embodiment of the present disclosure, a method for performing, sidelink communication, by a first device may be proposed. The method may comprise: transmitting, to a second device, first sidelink control information (SCI) through a first physical sidelink control channel (PSCCH); transmitting, to the second device, second SCI, in which a transmission resource is determined based on the first SCI, and data, through a first physical sidelink shared channel (PSSCH) related to the first PSCCH; receiving, from the second device, sidelink hybrid automatic repeat request (HARQ) feedback information regarding the first PSSCH; starting a first timer for the sidelink HARQ feedback information regarding the first PSSCH; and performing sidelink communication with the second device, based on the first timer and the sidelink HARQ feedback information, wherein a second PSCCH different from the first PSCCH and a second PSSCH different from the first PSSCH are not transmitted from the first device to the second device, based on the first timer running.

According to an embodiment of the present disclosure, a first device for performing sidelink communication may be proposed. The first device may comprise: one or more memories storing instructions; one or more transceivers; and one or more processors connected to the one or more memories and the one or more transceivers, wherein the one or more processors execute the instructions to: transmit, to a second device, first sidelink control information (SCI) through a first physical sidelink control channel (PSCCH); transmit, to the second device, second SCI, in which a transmission resource is determined based on the first SCI, and data, through a first physical sidelink shared channel (PSSCH) related to the first PSCCH; receive, from the second device, sidelink hybrid automatic repeat request (HARQ) feedback information regarding the first PSSCH; start a first timer for the sidelink HARQ feedback information regarding the first PSSCH; and perform sidelink communication with the second device, based on the first timer and the sidelink HARQ feedback information, wherein a second PSCCH different from the first PSCCH and a second PSSCH different from the first PSSCH are not transmitted from the first device to the second device, based on the first timer running.

According to an embodiment of the present disclosure, a device (or a chip(set)) configured to control a first user equipment (UE) may be proposed. The device may comprise: one or more processors; and one or more memories operably connectable to the one or more processors and storing instructions, wherein the one or more processors execute the instructions to: transmit, to a second UE, first sidelink control information (SCI) through a first physical sidelink control channel (PSCCH); transmit, to the second UE, second SCI, in which a transmission resource is determined based on the first SCI, and data, through a first physical sidelink shared channel (PSSCH) related to the first PSCCH; receive, from the second UE, sidelink hybrid automatic repeat request (HARQ) feedback information regarding the first PSSCH; start a first timer for the sidelink HARQ feedback information regarding the first PSSCH; and perform sidelink communication with the second UE, based on the first timer and the sidelink HARQ feedback information, wherein a second PSCCH different from the first PSCCH and a second PSSCH different from the first PSSCH are not transmitted from the first UE to the second UE, based on the first timer running.

According to an embodiment of the present disclosure, a non-transitory computer-readable storage medium storing instructions may be proposed. The instructions, when executed, may cause a first device to: transmit, to a second device, first sidelink control information (SCI) through a first physical sidelink control channel (PSCCH); transmit, to the second device, second SCI, in which a transmission resource is determined based on the first SCI, and data, through a first physical sidelink shared channel (PSSCH) related to the first PSCCH; receive, from the second device, sidelink hybrid automatic repeat request (HARQ) feedback information regarding the first PSSCH; start a first timer for the sidelink HARQ feedback information regarding the first PSSCH; and perform sidelink communication with the second device, based on the first timer and the sidelink HARQ feedback information, wherein a second PSCCH different from the first PSCCH and a second PSSCH different from the first PSSCH are not transmitted from the first device to the second device, based on the first timer running.

According to an embodiment of the present disclosure, a method for performing, by a second device, sidelink communication may be proposed. The method may comprise: receiving, from a first device, first sidelink control information (SCI) through a first physical sidelink control channel (PSCCH); receiving, from the first device, second SCI, in which a transmission resource is determined based on the SCI, and data, through a first physical sidelink shared channel (PSSCH) related to the first PSCCH; and transmitting, to the first device, sidelink hybrid automatic repeat request (HARQ) feedback information related to the first PSSCH, wherein a second PSCCH different from the first PSCCH and a second PSSCH different from the first PSSCH are not transmitted from the first device to the second device, based on the first timer running.

According to an embodiment of the present disclosure, a second device for performing sidelink communication may be proposed. The second device may comprise: one or more memories storing instructions; one or more transceivers; and one or more processors connected to the one or more memories and the one or more transceivers, wherein the one or more processors execute the instructions to: receive, from a first device, first sidelink control information (SCI) through a first physical sidelink control channel (PSCCH); receive, from the first device, second SCI, in which a transmission resource is determined based on the SCI, and data, through a first physical sidelink shared channel (PSSCH) related to the first PSCCH; and transmit, to the first device, sidelink hybrid automatic repeat request (HARQ) feedback information related to the first PSSCH, wherein a second PSCCH different from the first PSCCH and a second PSSCH different from the first PSSCH are not transmitted from the first device to the second device, based on the first timer running.

Effects of the Disclosure

According to the present disclosure, sidelink communication between devices (or UEs) can be efficiently performed.

According to the present disclosure, it is possible to efficiently operate a sidelink HARQ timer based on sidelink HARQ feedback information in NR V2X.

According to the present disclosure, it is possible to efficiently reduce power consumption for a sensing operation.

DESCRIPTION OF EXEMPLARY EMBODIMENTS

Figure 1:
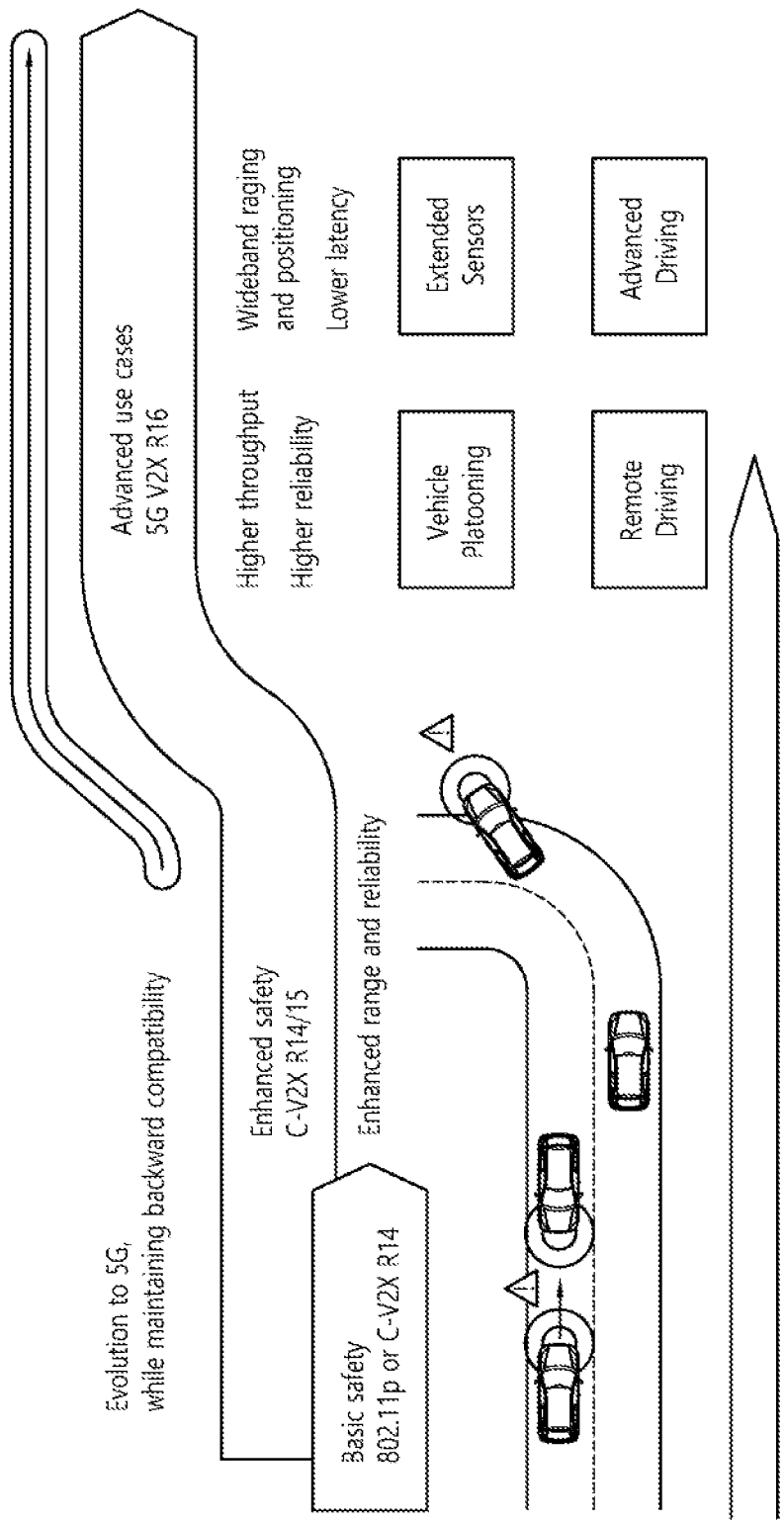
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
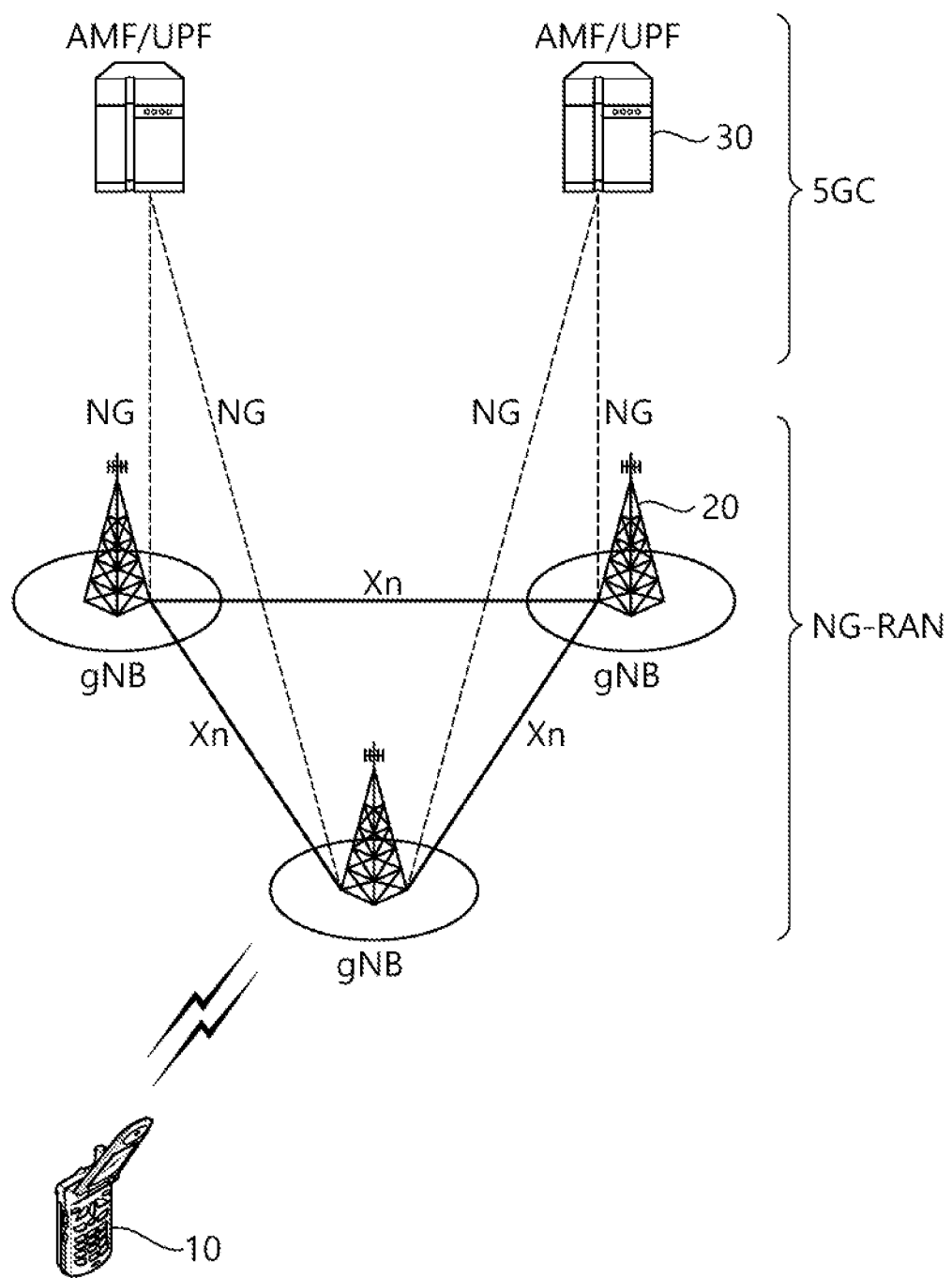
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
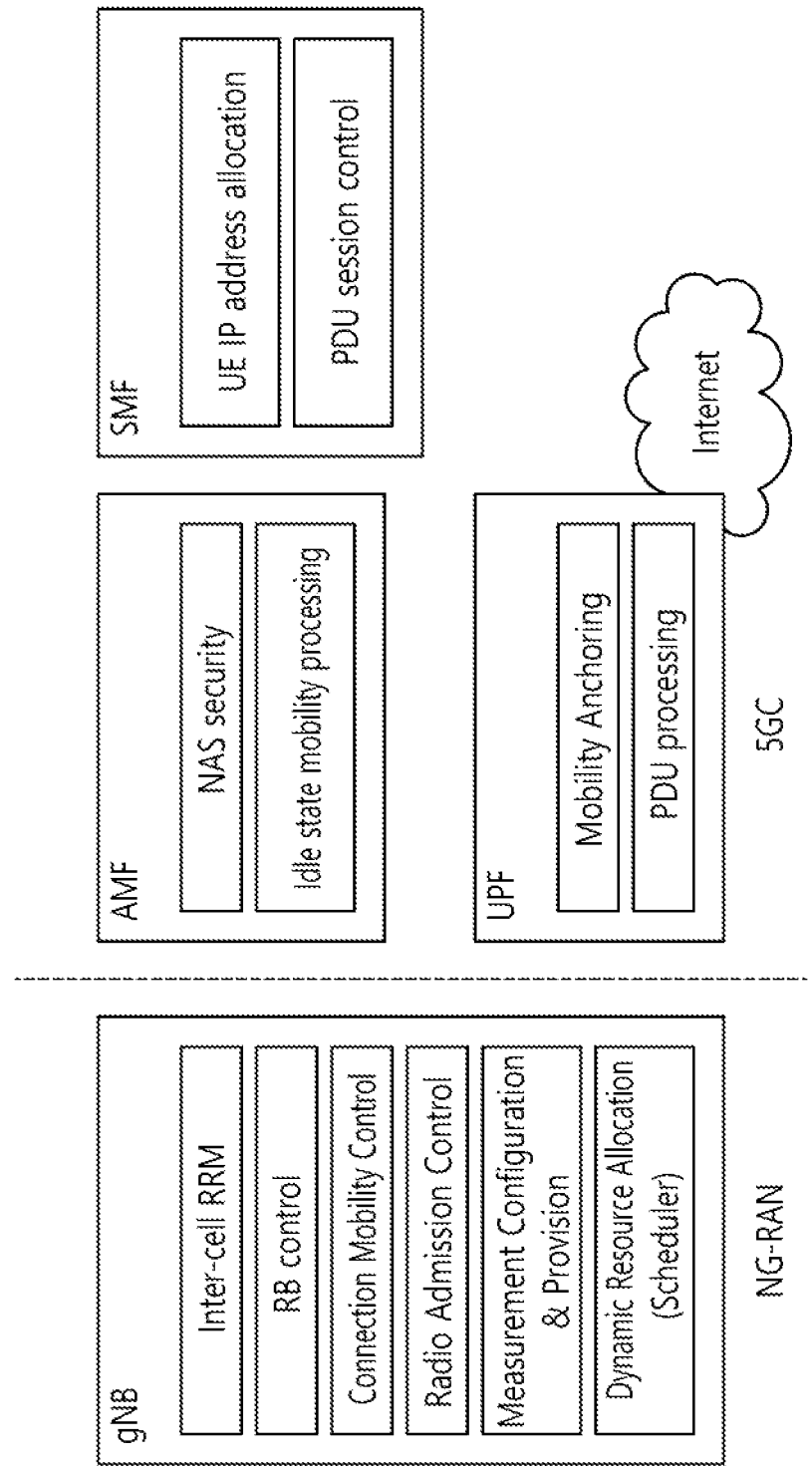
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
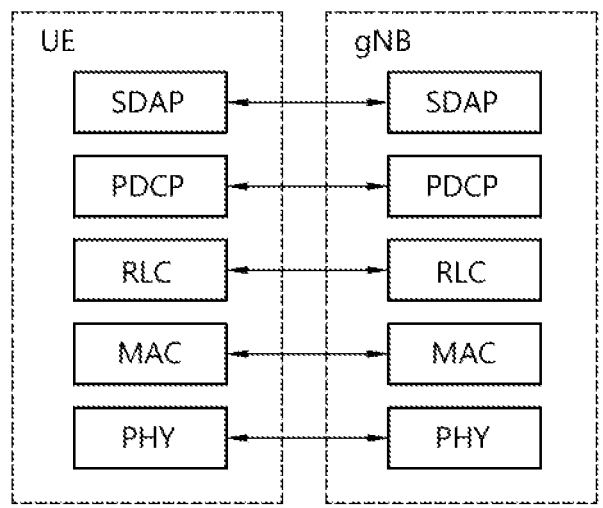
FIGS. 4A and 4B show a radio protocol architecture, based on an embodiment of the present disclosure.
Figure 4B:
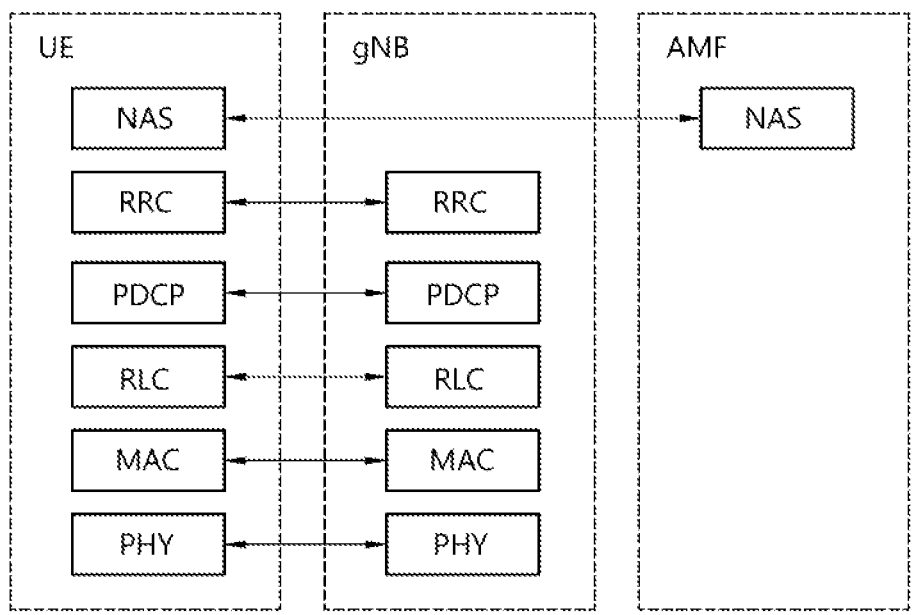

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an higher layer with an information transfer service through a physical channel. The physical layer is connected to a medium access control (MAC) layer which is an higher layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
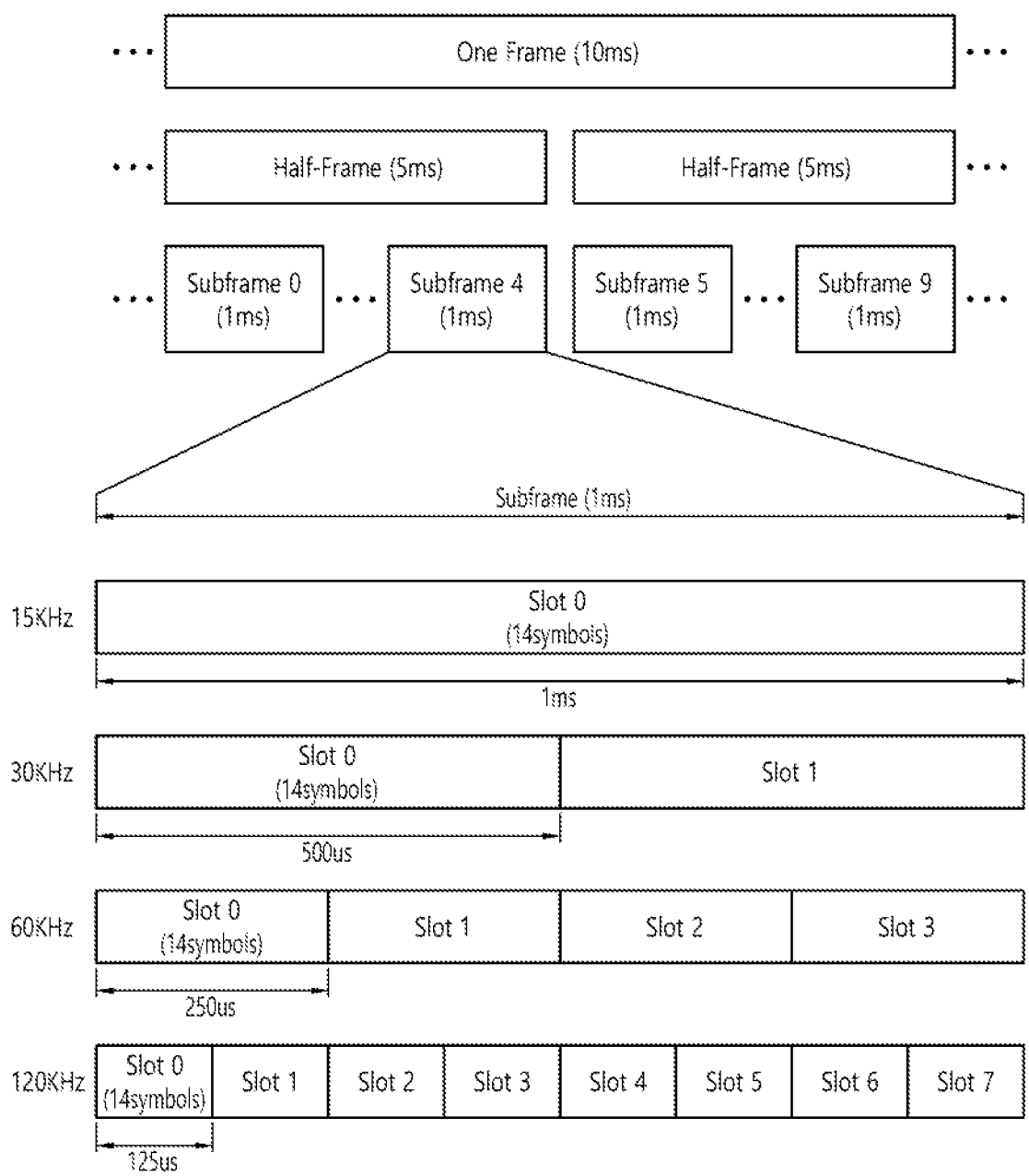
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*$2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*$2^u$) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*$2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
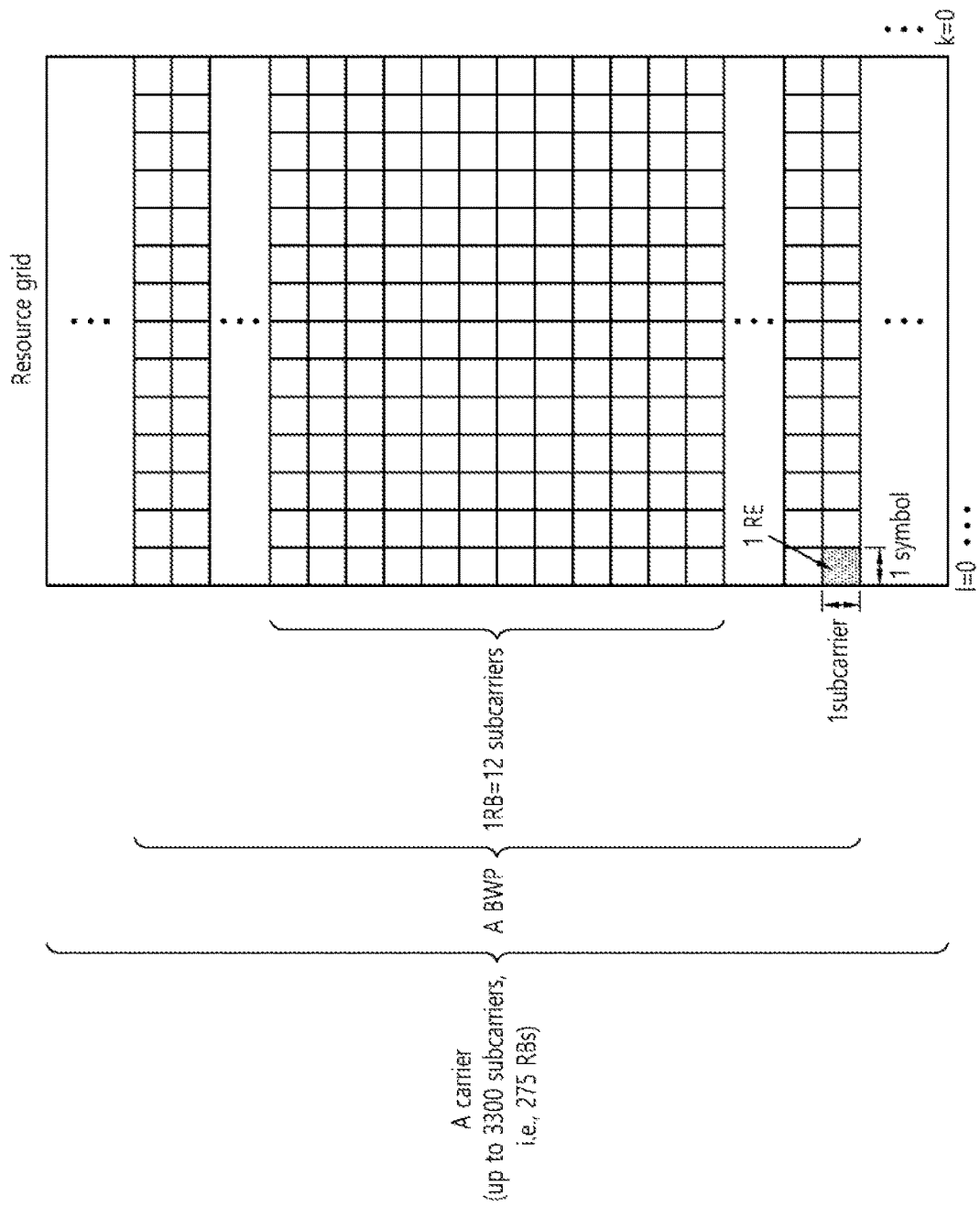
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRB s) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
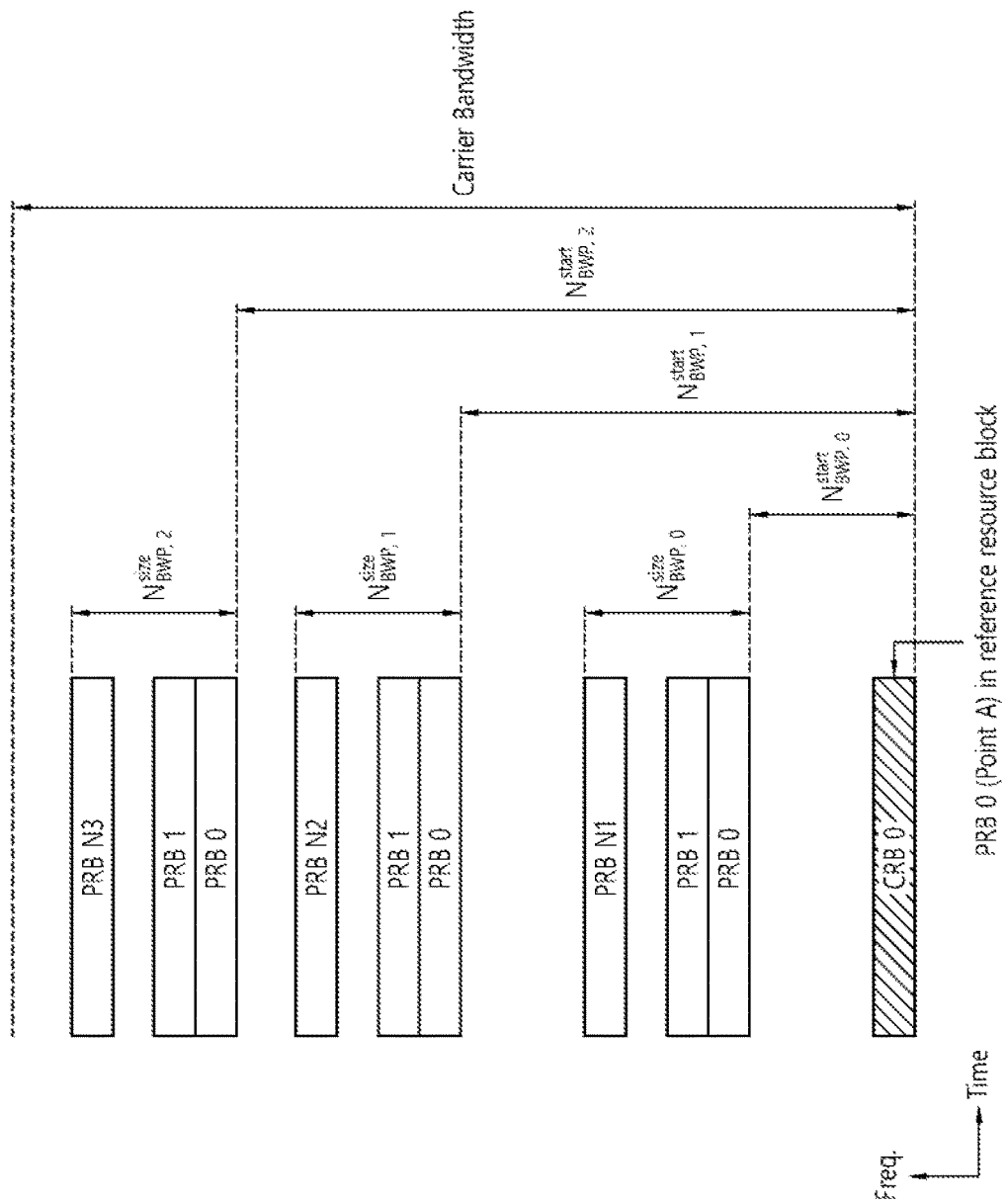
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
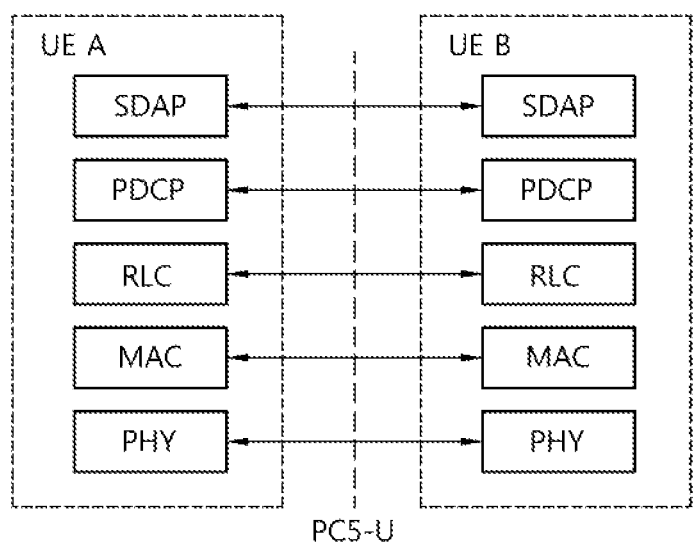
FIGS. 8A and 8B show a radio protocol architecture for a SL communication, based on an embodiment of the present disclosure.
Figure 8B:
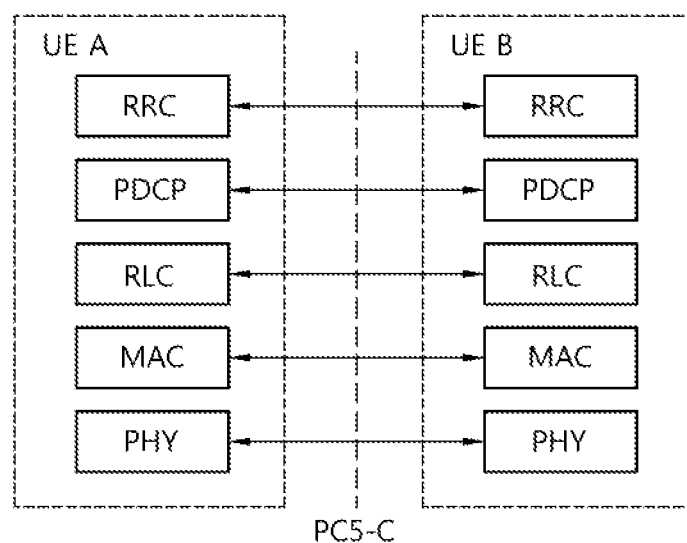

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
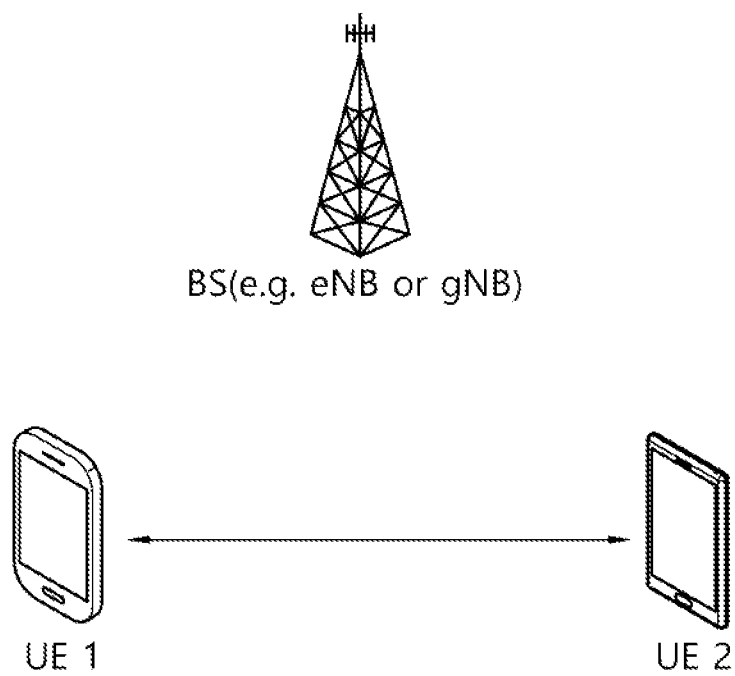
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
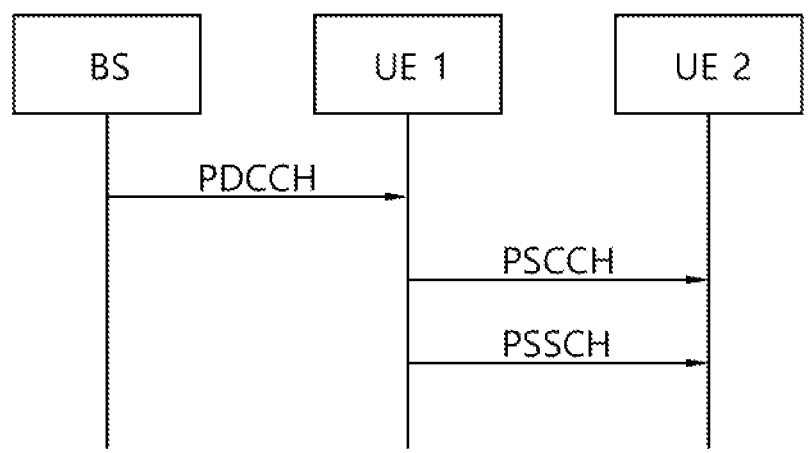
FIGS. 10A and 10B show a procedure of performing V2X or SL communication by a UE based on a transmission mode, based on an embodiment of the present disclosure.
Figure 10B:
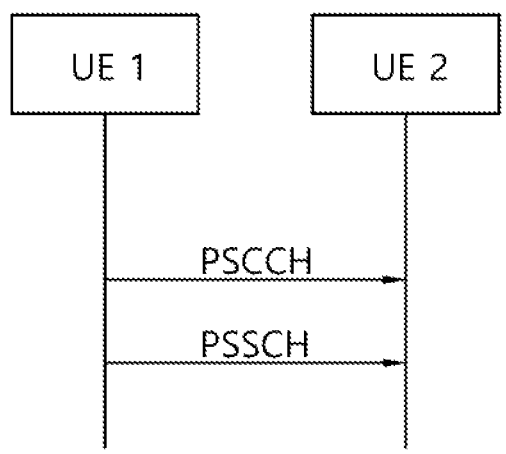

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
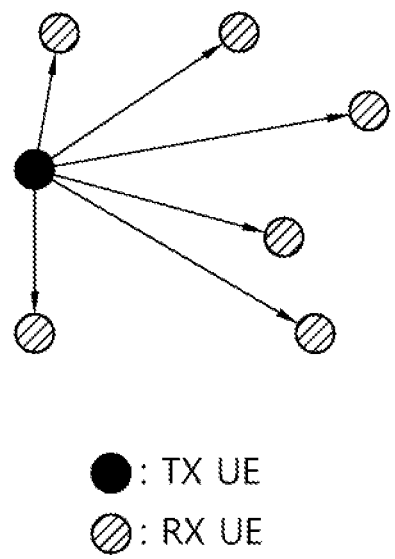
FIGS. 11A to 11C show three cast types, based on an embodiment of the present disclosure.
Figure 11B:
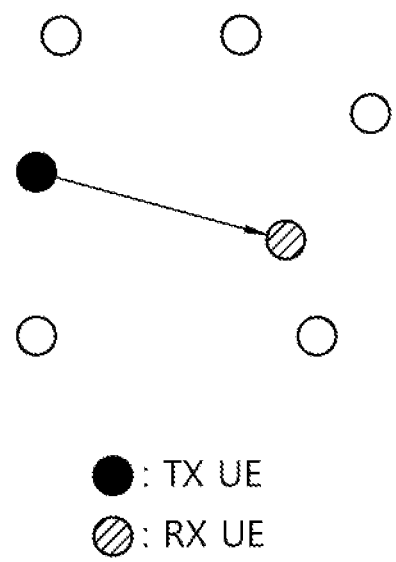
Figure 11C:
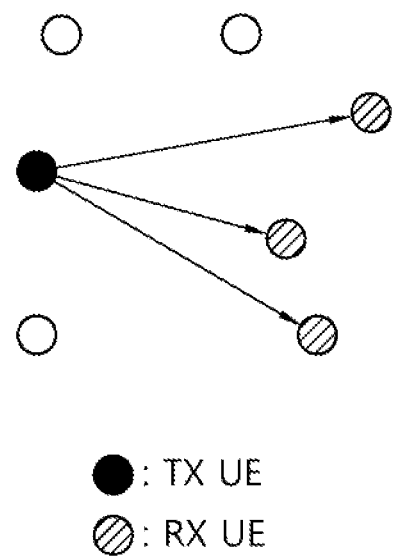

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an device supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

Meanwhile, in various embodiments of the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the highest priority value may have the lowest priority.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

A UE may perform a DRX operation while performing procedures and/or methods described/proposed above. A DRX configured UE may reduce power consumption by discontinuously receiving a DL signal. DRX may be performed in RRC (Radio Resource Control)_IDLE state, RRC_INACTIVE state, and RRC_CONNECTED state. In RRC_IDLE state and RRC_INACTIVE state, DRX is used to receive paging signal discontinuously. Hereinafter, DRX performed in RRC_CONNECTED state will be described (RRC_CONNECTED DRX).

A DRX cycle consists of On Duration and Occasion for DRX. A DRX cycle defines a time interval in which On Duration is periodically repeated. On Duration indicates a time period that a UE monitors to receive a PDCCH. When DRX is configured, a UE performs PDCCH monitoring during On Duration. If there is a successfully detected PDCCH during PDCCH monitoring, the UE operates an inactivity timer and maintains an awake state. On the other hand, if there is no PDCCH successfully detected during PDCCH monitoring, the UE enters a sleep state after the On Duration ends. Therefore, when DRX is configured, PDCCH monitoring/reception may be discontinuously performed in the time domain in performing the procedures and/or methods described/proposed above. For example, when DRX is configured, in the present disclosure, a PDCCH reception occasion (e.g., a slot having a PDCCH search space) may be configured discontinuously according to a DRX configuration. On the other hand, when DRX is not configured, PDCCH monitoring/reception may be continuously performed in the time domain in performing the procedures and/or methods described/proposed above. For example, when DRX is not configured, a PDCCH reception occasion (e.g., a slot having a PDCCH search space) in the present disclosure may be continuously configured. Meanwhile, regardless of whether DRX is configured or not, PDCCH monitoring may be limited in a time interval configured as a measurement gap.

Table 6 shows a process of a UE related to DRX (RRC_CONNECTED state). Referring to Table 6, DRX configuration information is received through higher layer (e.g., RRC) signaling, and whether DRX ON/OFF is controlled by a DRX command of a MAC layer. When DRX is configured, a UE may discontinuously perform PDCCH monitoring in performing the procedure and/or method described/proposed in the present disclosure.

TABLE 6

| | Type of signals | UE procedure |
|---|---|---|
| 1$^{st}$ step | RRC signalling(MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

Here, MAC-CellGroupConfig includes configuration information necessary to configure MAC (Medium Access Control) parameters for a cell group. MAC-CellGroupConfig may also include configuration information related to DRX. For example, MAC-CellGroupConfig may include information as follows to define DRX.

Value of drx-OnDurationTimer: defines the length of a start interval of the DRX cycleDRX.

Value of drx-InactivityTimer: defines the length of the time interval in which a UE remains awake after a PDCCH occasion in which a PDCCH indicating an initial UL or DL data is detected.

Value of drx-HARQ-RTT-TimerDL: defines the length of the maximum time interval from when DL initial transmission is received until DL retransmission is received.

Value of drx-HARQ-RTT-TimerDL: defines the length of the maximum time interval after a grant for UL initial transmission is received until a grant for UL retransmission is received.

drx-LongCycleStartOffset: defines the length of time and the starting point of a DRX cycle.

drx-ShortCycle (optional): defines the length of time of short DRX cycle.

Here, if any one of drx-OnDurationTimer, drx-InactivityTimer, drx-HARQ-RTT-TimerDL, drx-HARQ-RTT-TimerDL is running, a UE performs PDCCH monitoring at every PDCCH occasion while maintaining the awake state.

Meanwhile, in various embodiments of the present disclosure, for example, a transmitting UE (TX UE) may be a UE transmitting data to a (target) receiving UE (RX UE). For example, a TX UE may be a UE transmitting a PSCCH and/or a PSSCH. And/or, for example, a TX UE may be a UE that transmits an SL CSI-RS and/or SL CSI report request indicator to a (target) RX UE. And/or, for example, a TX UE to the (target) RX UE to be used for SL (L1) RSRP measurement (predefined) RS (e.g., PSSCH DM-RS) (and/or SL (L1) RSRP Report request indicator) may be a UE performing transmission. And/or, for example, a TX UE may be a UE that performs (pre-defined) RS (e.g., PSSCH DM-RS) (and/or SL (L1) RSRP report request indicator) transmission to be used for SL (L1) RSRP measurement to a (target) RX UE. And/or, for example, a TX UE may be a UE transmitting a (control) channel (e.g., PSCCH, PSSCH, etc.) and/or a reference signal (e.g., DM-RS, CSI-RS, etc.) on the (control) channel, to be used for SL RLM and/or SL RLF operation of a (target) RX UE.

Meanwhile, in the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, for example, when an RX UE transmits SL HARQ feedback information for the PSSCH and/or PSCCH received from a TX UE, the method below or some of the methods below may be considered. Here, for example, the following scheme or some of the following schemes may be limitedly applied only when an RX UE successfully decodes/detects a PSCCH scheduling a PSSCH.

(1) Groupcast HARQ feedback option 1: NACK information may be transmitted to a TX UE only when an RX UE fails to decode/receive a PSSCH received from the TX UE.

(2) Groupcast HARQ feedback option 2: If an RX UE succeeds in decoding/receiving a PSSCH received from a TX UE, transmit ACK information to the TX UE, and if the RX UE fails to decode/receive a PSSCH, it may transmit NACK information to the TX UE.

Meanwhile, in the present disclosure, a TX UE may transmit the entirety or part of information described below to RX UE(s) through SCI(s). Herein, for example, the TX UE may transmit the entirety or part of the information described below to the RX UE(s) through a first SCI (FIRST SCI or 1$^{st}$-stage SCI) and/or a second SCI (SECOND SCI or 2$^{nd}$-stage SCI).

PSSCH (and/or PSCCH) related resource allocation information (e.g., the number/positions of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information
New data indicator (NDI) information
Redundancy version (RV) information
(Transmission traffic/packet related) QoS information (e.g., priority information)
SL CSI-RS transmission indicator or information on the number of (to-be-transmitted) SL CSI-RS antenna ports
Location information of the TX UE or location (or distance region) information of target RX UE(s) (for which SL HARQ feedback is requested)
Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in various embodiments of the present disclosure, for example, a TX UE may transmit SCI, first SCI and/or second SCI through PSCCH to an RX UE, PSCCH may be replaced/substituted with at least one of SCI, first SCI, and/or second SCI. And/or, for example, SCI may be replaced/replaced by PSCCH, first SCI and/or second SCI. And/or, for example, since a TX UE may transmit second SCI to an RX UE through PSSCH, the PSSCH may be replaced/substituted with second SCI.

Meanwhile, in the present disclosure, for example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "define" may mean (resource pool specific) (PRE)CONFIGURATION from a base station or network (via predefined signaling (e.g., SIB, MAC, RRC, etc.).

On the other hand, in the present disclosure, for example, an RLF may be determined based on an OUT-OF-SYNCH (OOS) indicator or an IN-SYNCH (IS) indicator, it can be replaced/replaced by OUT-OF-SYNCH (OOS) or IN-SYNCH (IS).

Meanwhile, in the present disclosure, for example, a resource block (RB) (or PRB) may be replaced/substituted with a subcarrier, or vice versa. For example, a packet or a traffic may be replaced/substituted with a transport block (TB) or a medium access control protocol data unit (MAC PDU) according to a transmission layer, or vice versa.

For example, a code block group (CBG) may be replaced/substituted with a TB, or vice versa.

For example, a source ID may be replaced/substituted with a destination ID, or vice versa.

For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in various embodiments of the present disclosure, for example, a dynamic grant (DG) may be substituted/changed with a configured grant (CG) and/or an SPS grant. For example, a dynamic grant may be substituted/replaced with a combination of a configured grant and an SPS grant. Alternatively, for example, a configured grant may be substituted/replaced with a type 1 configured grant or a type 2 configured grant.

Meanwhile, in various embodiments of the present disclosure, for example, a channel may be substituted/changed with a signal.

Meanwhile, in various embodiments of the present disclosure, for example, a cast type may be substituted/changed with unicast, groupcast, and/or broadcast.

Meanwhile, in the present disclosure, a resource may be replaced/substituted with a slot or a symbol, or vice versa.

Meanwhile, in various embodiments of the present disclosure, blind retransmission may mean an operation in which a TX UE performs retransmission without receiving SL HARQ feedback information from an RX UE. Also, for example, retransmission based on SL HARQ feedback may mean an operation in which a TX UE determines whether to perform retransmission based on SL HARQ feedback information received from an RX UE, and performs retransmission. Specifically, for example, when a TX UE performs SL HARQ feedback-based retransmission, when the TX UE receives NACK and/or DTX from an RX UE, retransmission may be performed to the RX UE.

On the other hand, in various embodiments of the present disclosure, time in a point of view of a resource may be substituted/changed with frequency. For example, a time resource may be substituted/changed with a frequency resource.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

In sleep states of a UE, there are i) Deep sleep where a UE operates in the lowest power consumption mode, the baseband circuitry maintains timing at the lowest level of accuracy, other baseband activity is minimal, and the RF circuitry is not active, ii) Light sleep, which uses a clock and activity level to keep timing so it can start receiving with a fairly small delay, and iii) Micro sleep, which consumes relatively high power compared to light sleep, but can be turned on and off without delay or with negligible delay and the timing is maintained. Light sleep is an on/off operation in units of slots or ms, and micro sleep may be on/off in units of symbols. In the light sleep, the sum of the time period for entering on and the time period for entering off is 6 ms, and non-zero energy may be consumed, and the micro sleep may have no delay and no additional energy consumption.

Figure 12:
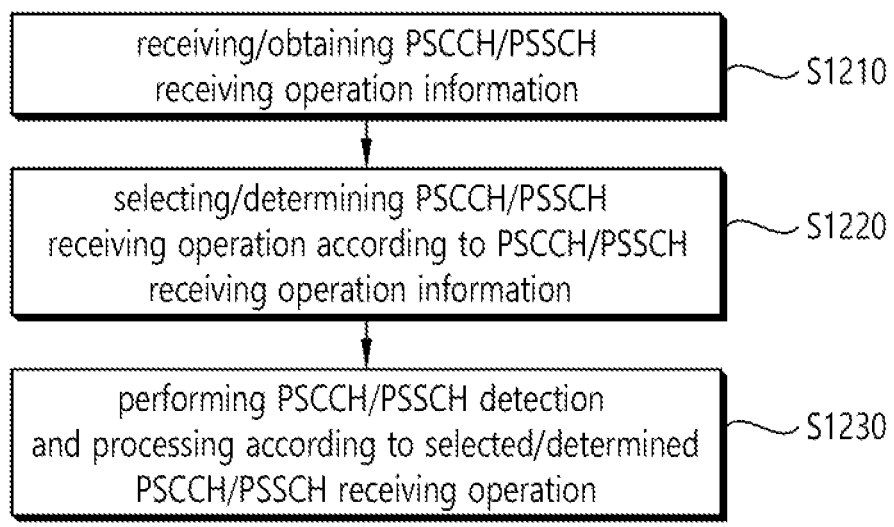
FIG. 12 is a diagram showing a method for a first device to perform PSCCH/PSSCH detection and processing based on PSCCH/PSSCH reception operation information/conditions, according to an embodiment of the present disclosure.

FIG. 12 is a diagram showing a method for a first device to perform PSCCH/PSSCH detection and processing based on PSCCH/PSSCH reception operation information/conditions, according to an embodiment of the present disclosure. The embodiment of FIG. 12 may be combined with various methods and/or procedures proposed according to various embodiments of the present disclosure.

Referring to FIG. 12, in step S1210, a first device may receive/obtain PSCCH/PSSCH reception operation information from a second device. For example, the second device may be a base station or a UE. For example, PSCCH/PSSCH reception operation information may include an SL discontinuous reception (DRX) operation parameter, a sensing operation parameter, and a resource allocation parameter. For example, according to various embodiments of the present disclosure, a first device may receive/obtain PSCCH/PSSCH reception operation information from a second device.

In step S1220, a first device may select/determine a PSCCH/PSSCH reception operation method based on PSCCH/PSSCH reception operation information.

In step S1230, a first device 100 may perform PSCCH/PSSCH detection and processing according to the selected/determined PSCCH/PSSCH reception operation.

Hereinafter, various embodiments and examples directly or indirectly related to at least one of steps S1210 to S1230 will be reviewed.

In one embodiment, DRX operation may be supported for PSCCH and/or SCI monitoring. In a resource pool, a UE may attempt to detect PSCCH and/or SCI in all SL slots, and if actual traffic does not occur, that is, when actual PSCCH and/or SCI are not transmitted, the UE may unnecessarily consume power. In addition, since a UE cannot know whether the corresponding received PSCCH/PSSCH is for the corresponding UE or not until an SCI detection (including the 2nd SCI) is completed, at least during the SCI decoding time interval, the UE may need to perform data buffering for later PSSCH decoding (that is, a process of turning on an RF circuit and storing a raw data of the received signal), and if the corresponding PSSCH is not for the corresponding UE after SCI decoding, unnecessary power consumption such as PSSCH buffering may occur. On the other hand, at least in performing a sensing operation for resource (re)selection, etc., PSCCH and/or SCI detection may still be attempted.

For example, a UE may perform data buffering and/or processing for PSCCH and/or 2nd SCI detection in a specific slot, but not processing for PSSCH or SL-SCH reception and decoding. In this case, a UE turns on an RF circuit only in the time period in which a PSCCH and/or the 2nd SCI are transmitted, and thereafter, the UE power consumption can be saved by setting the state of the UE to micro sleep. As another method, a UE may not attempt to detect a PSCCH in a specific slot. Hereinafter, the scheme will be referred to as a simplified PSCCH/PSSCH operation. On the other hand, general PSCCH/PSSCH reception and related processing operations are called as normal PSCCH/PSSCH operations. On the other hand, if data buffering and related processing are not performed on a PSSCH or SL-SCH, the SL-SCH may not be properly decoded or the delay time may be increased when traffic to be received by the corresponding UE is generated. Therefore, it is necessary to efficiently define a time interval in which a simplified PSCCH/PSSCH operation method is performed and a time interval in which a normal PSCCH/PSSCH operation method is performed.

For example, a PSCCH/PSSCH operation method may be different according to the sidelink DRX operation. More specifically, before a drx-InativityTimerSL for a sidelink operates or before a receiving UE receives a PSCCH/PSSCH (for new transmission) targeted for the receiving UE, a simplified PSCCH/PSSCH reception operation (e.g., an operation that attempts only PSCCH and/or SCI detection) is performed, and after a drx-InativityTimerSL operates or after a receiving UE receives a PSCCH/PSSCH (for new transmission) targeting the receiving UE, a normal PSCCH/PSSCH reception operation (e.g., PSCCH, SCI, PSSCH detection and decoding operation) may be performed. Also, in a time interval for receiving retransmission SCI (e.g., a time interval in which drx-RetransmissionSL is operating), a normal PSCCH/PSSCH reception operation may be performed.

For example, a UE performs a simplified PSCCH/PSSCH reception operation (e.g., an operation that attempts only PSCCH and/or SCI detection) in a sensing window, and in all or part of an active time according to a DRX operation (e.g., after PSCCH/PSSCH for the corresponding UE is transmitted), the UE may perform a normal PSCCH/PSSCH reception operation (e.g., PSCCH, SCI, PSSCH detection and decoding operation). In other areas, a UE may not attempt to detect a PSCCH.

For example, in a plurality of PSCCH/PSSCH resources indicated by SCI, a simplified PSCCH/PSSCH reception operation (e.g., an operation of only trying to detect PSCCH and/or SCI) is performed on some indicated resources, and in the remaining indicated resources, a normal PSCCH/PSSCH reception operation (e.g., an operation for attempting to detect and decode PSCCH, SCI, and PSSCH) is performed. More specifically, among resources indicated by SCI, a UE may perform a simplified PSCCH/PSSCH reception operation on the most advanced indicated resource in time. Alternatively, a UE may perform a simplified PSCCH/PSSCH reception operation for a reserved signal for indicating a plurality of PSCCH/PSSCH resources. Accordingly, a UE may save power consumption until it actually receives SCI it has to receive, and after receiving the actual SCI, it can perform a normal PSCCH/PSSCH reception operation from the second resource indicated by the SCI. More characteristically, in a resource indicated by a reserved signal or SCI which is the earliest in time, a transmission method may be limited in such a way that the 2nd SCI is maximally FDMed with the corresponding PSCCH. For example, it may be a form in which PSSCH DMRS pattern that can be used for 2nd SCI is arranged in front of SL slot and/or a form in which the first symbol position of PSSCH DMRS is FDM with PSCCH.

For example, if the number of HARQ processes in progress of a receiving UE exceeds or be equal to a specific threshold, the receiving UE does not attempt to detect PSCCH, or attempts only to detect PSCCH and/or SCI, and does not perform data buffering. The threshold for the number of HARQ processes may be (pre-)configured for each resource pool, or configured through PC5-RRC or physical layer signaling. More characteristically, in the sensing period for resource (re)selection, detection of PSCCH and/or SCI may be attempted.

For example, a PSCCH/PSSCH reception operation may be indicated through higher layer signaling (e.g., MAC message or PC5-RRC signaling) or SCI indication (e.g., 1st SCI and/or 2nd SCI). For example, a receiving UE may perform a PSSCH/PSSCH reception operation (e.g., a simplified reception operation or a normal reception operation) configured by the corresponding indicator after a specific offset from the point at which the corresponding indicator is received. The specific offset may be a value based on a slot in a (RX) receive resource pool. The specific offset may be a value (pre-)configured for each resource pool, a value configured by PC5-RRC or physical layer signaling, or a predetermined fixed value.

Each of the above methods may be performed exclusively, or a combination of all or a part may be performed together.

Figure 13:
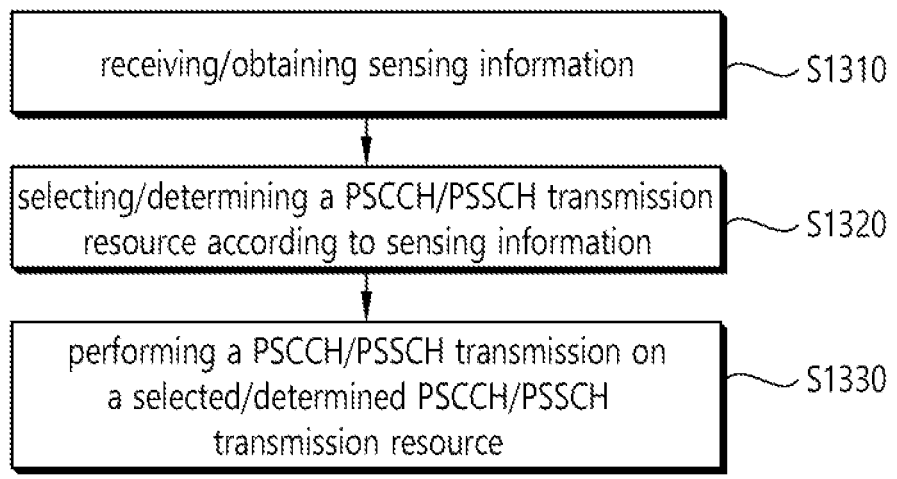
FIG. 13 shows a method for a first device to transmit a PSCCH or a PSSCH according to sensing information, according to an embodiment of the present disclosure.

FIG. 13 shows a method for a first device to transmit a PSCCH or a PSSCH according to sensing information, according to an embodiment of the present disclosure. The embodiment of FIG. 13 may be combined with various methods and/or procedures proposed according to various embodiments of the present disclosure.

Referring to FIG. 13, in step S1310, a first device may receive/obtain sensing information.

In step S1320, a first device may receive/obtain sensing information.

In step S1330, a first device may perform PSCCH/PSSCH transmission in a selected/determined PSCCH/PSSCH transmission resource.

Hereinafter, various embodiments and examples directly or indirectly related to at least one of steps S1310 to S1330 will be reviewed.

DRX operation may be supported for PSCCH and/or SCI monitoring. That is, a UE may attempt to detect PSCCH and/or SCI in some SL slots within a resource pool. In this case, there may be a problem that SCI transmitted to another UE cannot be properly detected during a sensing operation for a resource (re)selection process, and in addition, resource collision or high interference may occur by selecting a resource already occupied by another UE in the resource selection period again. Conversely, when a UE exceptionally performs PSCCH and/or SCI monitoring regardless of DRX operation in a sensing period, the degree of power consumption due to the use of DRX may be insignificant or absent depending on the size and configuration of the sensing period. Accordingly, it may be considered that a third UE measures/collects information related to sensing and/or information related to resource selection instead of a UE and transmits it to the corresponding UE. Meanwhile, the third UE may have a different geographic location from a target UE, and may also have a different channel environment. Accordingly, sensing and/or resource selection related information transmitted by the third UE may not be useful to the target UE. An embodiment of the present disclosure proposes a method of configuring/generating sensing and/or resource selection related information. In addition, as a part of increasing the accuracy of the corresponding information, a method of transmitting information about a third UE to a target UE and a method of configuring the information are proposed. In addition, we propose a method in which a target UE performs a resource (re)selection process based on information received from a third UE.

For example, a UE performing DRX operation for PSCCH and/or SCI (trying to detect PSCCH and/or SCI for some slots) may attempt SCI detection and decoding only in an active time (active time, a time duration in which PSCCH and/or SCI detection is allowed) according to the DRX operation in a sensing period for a resource (re)selection process.

For example, a third device (e.g., save form as a RSU (remote sensing unit)) may perform and store reference signal received power (RSRP) measurement using PSCCH DMRS and/or PSSCH DMRS, by attempting and decoding a sensing operation, that is, PSCCH and/or SCI detection, for all or some slots in a resource pool. The sensing result may include single or multiple sub-channel indexes and/or number of sub-channels and/or slot indexes and/or RSRP information based on PSCCH DMRS for the corresponding subchannel and slot and/or PSSCH DMRS-based RSRP information and/or L1-priority and/or L1-destination ID and/or L1-source ID, etc. The third device may collect the sensing information in the single or a plurality of subchannels and/or slots and transmit the sensing information to another UE. As a more specific example, in order to transmit measurement information measured and/or aggregated to a UE performing a DRX operation for PSCCH and/or SCI, a third device may transmit the sensing information in a (time) period (time period for detecting PSCCH and/or SCI in the minimum (pre-)configured period) in which the active time and/or drx-OnDurationTimerSL operate in the corresponding UE. The amount of the sensing information may be large, and accordingly, the corresponding information may be transmitted in the form of PSSCH or SL-SCH. Alternatively, the information may be transmitted through a 2nd SCI according to the amount of information. For example, as part of reducing the amount of sensing information, (sensing information) may include a combination for a subchannel group and/or a slot group and/or RSRP information and/or L1-priority for the corresponding group. The PSCCH/PSSCH corresponding to the sensing information may be a broadcast for a plurality of UEs or a groupcast type. The receiving UE may be (pre-)configured with L1-destination ID and/or L1-source ID for PSCCH/PSSCH including sensing information.

For example, a third device may include information regarding the third device when transmitting/transmitting sensing information to another UE. This may be information helpful in determining whether a receiving UE utilizes the corresponding sensing information.

For example, a third device may transmit information on a geographic location or information corresponding thereto (e.g., Zone ID) together with sensing information. For example, a third device may indicate a Zone ID based on its own location information in 2nd SCI when transmitting sensing information, or may transmit location information through higher layer signaling. Through this, when a receiving UE receives the sensing information from another device and the distance is close, there is an advantage in that it can be determined that the corresponding sensing information is valid or that the accuracy is high. On the other hand, when the distance from the corresponding device is far, it may be determined that the corresponding sensing information is invalid or that the accuracy is low. For example, if the distance between a UE that provided sensing information and a UE that received it is less than or less than a specific threshold (predefined or (pre-)configured value), the sensing result may be utilized for resource (re)selection of the corresponding UE. That is, it is possible to replace the measurement value in the time interval that the user has not received with the received sensing result. In other cases, the received sensing result may not be used for resource (re) selection. For example, when information directly measured by a UE and sensing information transmitted from a third device coexist with respect to a sensing result of a specific time period, when performing the resource (re)selection process, (1) directly measured information can be used, or (2) received sensing information can be used.

For example, a UE receiving sensing information may measure RSRP based on a PSCCH DMRS or the PSSCH DMRS for a PSCCH/PSSCH to which the sensing information is transmitted. It may be determined whether to use the received sensing result based on the RSRP value. For example, when the measured RSRP value is greater than or greater than a specific threshold (predefined or (pre-)configured value), the sensing result may be utilized for resource (re)selection of the corresponding UE. In other cases, the received sensing result may not be used for resource (re)selection.

Figure 14:
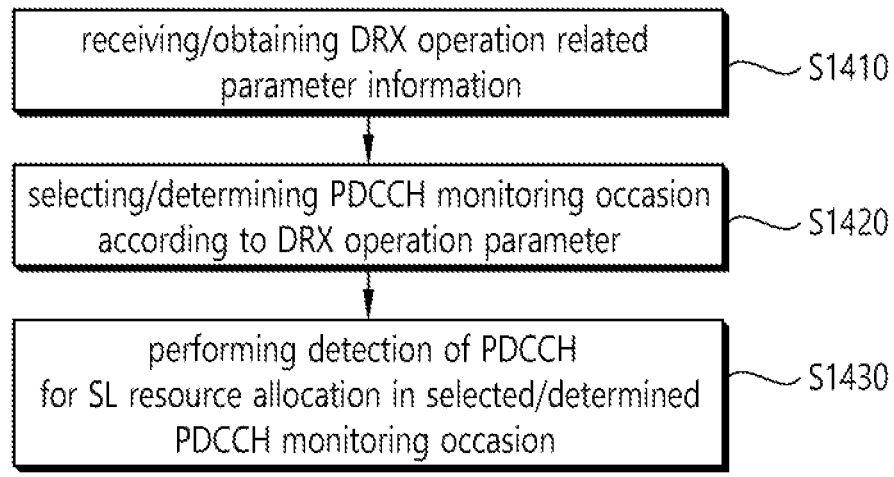
FIG. 14 shows a method for a first device to perform a PDCCH detection attempt for SL transmission based on a DRX operation parameter, according to an embodiment of the present disclosure.

FIG. 14 shows a method for a first device to perform a PDCCH detection attempt for SL transmission based on a DRX operation parameter, according to an embodiment of the present disclosure. The embodiment of FIG. 14 may be combined with various methods and/or procedures proposed according to various embodiments of the present disclosure.

Referring to FIG. 14, in step S1410, a first device may receive/obtain DRX operation related parameter information from a second device. For example, the second device may be a base station. For example, the parameter information related to the DRX operation may include drx-InactivityTimerSL, drx-RetransmissionSL, and drx-HARQ-RTT-SL. For example, according to various embodiments of the present disclosure, the first device may receive/obtain DRX operation related parameter information from the second device.

In step S1420, the first device may select/determine a PDCCH monitoring period for SL resource allocation based on DRX operation related parameter information.

In step S1430, the first device may perform a PDCCH detection attempt for sidelink transmission in the selected/determined PDCCH monitoring period.

Hereinafter, various embodiments and examples directly or indirectly related to at least one of steps S1410 to S1430 will be reviewed.

In an embodiment, when a DRX operation is configured, a UE may basically perform PDCCH monitoring in an ON duration. More specifically, the On duration may be configured for a specific slot based on a period and an offset configured by a higher layer. In addition, a drx-OnDurationTimer may start operation according to a period, and the UE may perform PDCCH monitoring until the corresponding timer expires. When the UE receives a PDCCH indicating new transmission (for downlink or uplink) within the on duration, by (re)starting the operation of the drx-InactivityTimer from the first symbol after receiving the corresponding PDCCH, an active time for PDCCH monitoring can be extended. When the UE receives a PDCCH for a downlink signal, the UE may (re)start drx-HARQ-RTT-TimerDL in the first symbol after transmission for the corresponding DL HARQ feedback, or if the corresponding drx-HARQ-RTT-TimerDL expires and a TB for the corresponding HARQ process is not properly decoded, the active time can be extended by (re)starting the drx-RetransmissionTimerDL operation for the corresponding HARQ process. This may be for receiving a PDCCH including retransmission information. Similarly, when a UE receives a MAC PDU for a Configured DL assignment, the UE may (re)start drx-HARQ-RTT-TimerDL in the first symbol after transmission of the corresponding DL HARQ feedback, and if the corresponding drx-HARQ-RTT-TimerDL expires and the TB for the corresponding HARQ process is not properly decoded, the active time can be extended by (re)starting the drx-RetransmissionTimerDL operation for the corresponding HARQ process. On the other hand, in the case of the NR sidelink, an operation in which a UE receives a PDCCH and/or a higher layer signal for allocating a sidelink resource from a base station may be supported depending on an operation mode. In addition, a UE may transmit a specific HARQ process for sidelink resources or HARQ feedback for a specific resource interval to a base station, and may be assigned a retransmission for the corresponding sidelink transmission from the base station. Accordingly, the operation for receiving the PDCCH for the sidelink may need to be included in the DRX operation.

For example, a base station may configure drx-HARQ-RTT-TimerSL for a UE operating in sidelink mode 1. In addition, a base station may configure a drx-SLRetransmissionTimer for each HARQ process or for each UE (for an SL resource allocation method of a dynamic grant method). (For an SL resource allocation method of a configured grant method) drx-SLRetransmissionTimer can be configured for each HARQ process, for each UE, or for each SL resource interval. The SL resource interval is a single or a plurality of SL resources of a basic unit indicated by a base station when allocating SL resources (in a configured grant method), and SL resources may be allocated in a form in which the corresponding SL resource interval is repeated in an SL resource period configured in a higher layer. And/or, drx-InactivityTimerSL may be introduced. An active time for monitoring a PDCCH in a UE may include a time interval in which drx-SLRetransmissionTimer operates and/or a time interval in which drx-InactivtyTimerSL operates.

A UE may (re)start a drx-InactivityTimer operation or (re)start a drx-InactivtyTimerSL operation when receiving a PDCCH for allocating an SL resource for an initial transmission. Accordingly, an active time for performing PDCCH monitoring may be extended. For example, a timer operating according to a link (Uu link or side link) corresponding to a PDCCH may be different or the amount of extended active time may be different, this can be an advantage that can be optimized in extending the time period for PDCCH monitoring according to the type of traffic. For example, in the case of sidelink traffic, the amount of traffic may be relatively small compared to the traffic on Uu link, accordingly, the amount of extension of an active time due to PDCCH reception may be relatively small.

When a UE receives a PDCCH for allocating SL resources (of dynamic grant method), for the HARQ process indicated by a DCI, a drx-HARQ-RTT-TimerSL operation may be started from the first symbol after HARQ feedback transmission corresponding to the DCI or SL resource. In this case, the drx-HARQ-RTT-TimerSL operation that is being operated for the corresponding HARQ process may be stopped.

When a UE receives a PDCCH for allocating SL resources (of configured grant method), a drx-HARQ-RTT-TimerSL operation for a HARQ process or SL resource interval indicated by the corresponding DCI may be started from the first symbol after HARQ feedback transmission corresponding to the SL resource interval. In this case, the drx-HARQ-RTT-TimerSL operation in the corresponding SL resource interval may be stopped.

For example, when a UE transmits PSCCH/PSSCH (in an SL resource or resource interval allocated in a configured grant method), the UE may start a drx-HARQ-RTT-TimerSL operation for the corresponding SL resource interval from the first symbol after HARQ feedback transmission corresponding to the SL resource interval. For example, when a UE transmits a PSCCH/PSSCH (in an SL resource or resource interval allocated in the configured grant method), the UE may start the drx-HARQ-RTT-TimerSL operation for the corresponding SL resource interval at the first symbol after the corresponding SL resource interval. For example, when a UE transmits PSCCH/PSSCH (in an SL resource or resource interval allocated in a configured grant method), a UE may start a drx-HARQ-RTT-TimerSL operation for the corresponding SL resource interval at the first symbol after the time of receiving the corresponding PDCCH. For example, a base station may transmit the configured grant to the UE through the PDCCH. In this case, a UE may stop the drx-HARQ-RTT-TimerSL operation for the corresponding SL resource interval.

For example, depending on the synchronization source, the slot boundary for the SL and the slot boundary for the DL may not be aligned, and/or the positions of the DFN0 and the SFN0 may be different. In the above situation, for example, the position of the first symbol after the SL resource interval may be converted to the DL timing of the base station side. Alternatively, for example, the position of the first symbol after the SL resource interval may be converted to DL timing of the UE side.

For example, a UE may receive DCI from a base station at a first time point. For example, the DCI may include information on an offset related to an SL resource. For example, an offset related to an SL resource may be a slot unit offset related to the SL resource. For example, an offset related to an SL resource may be a symbol unit offset related to the SL resource. In addition, a UE may determine a time before TA/2 from the first time point as a second time point.

For example, when the DCI includes a symbol unit offset related to an SL resource, a UE may start an RTT timer operation in the first symbol after the offset from the second time point. For example, the first symbol may be a symbol (e.g., N+1-th symbol) subsequent to the last symbol (e.g., N-th symbol) of the SL resource allocated by the DCI.

For example, when the DCI includes a symbol unit offset related to an SL resource, the UE may start an RTT timer operation in the first symbol in the first slot after the offset from the second time point. For example, the first slot may be a slot (e.g., K+1-th slot) subsequent to the last slot (e.g., K-th slot) including the SL resource allocated by the DCI.

For example, if the DCI includes a slot unit offset related to an SL resource, the UE may start an RTT timer operation from the second time point in the first symbol in the first slot after the offset. For example, the first slot may be a slot (e.g., K+1-th slot) subsequent to the last slot (e.g., K-th slot) including the SL resource allocated by the DCI.

According to an embodiment of the present disclosure, in the case of a configured grant (CG) method based on an RRC configuration, the time at which the DCI is received may be replaced with SFN0 (or SFN=0). In addition, a timer start position may be corrected to a time point at which an offset value to closely match the region where the actual SL transmission will occur is applied. Specifically, for example, a UE may receive DCI from a base station at the first time point. For example, the DCI may include information on an offset related to an SL resource. For example, on offset related to an SL resource may be a slot unit offset related to the SL resource. For example, an offset related to an SL resource may be a symbol unit offset related to the SL resource. Here, a UE may determine, not the first time point, but a time point before TA/2 from SFN0 as the second time point.

For example, when the DCI includes a symbol unit offset related to an SL resource, the UE may start an RTT timer operation in the first symbol after the offset from the second time point. For example, the first symbol may be a symbol (e.g., N+1-th symbol) subsequent to the last symbol (e.g., N-th symbol) of the SL resource allocated by the DCI.

For example, when the DCI includes a symbol unit offset related to an SL resource, the UE may start an RTT timer operation in the first symbol in the first slot after the offset from the second time point. For example, the first slot may be a slot (e.g., K+1-th slot) subsequent to the last slot (e.g., K-th slot) including the SL resource allocated by the DCI.

For example, if the DCI includes a slot unit offset related to an SL resource, the UE may start an RTT timer operation from the second time point in the first symbol in the first slot after the offset. For example, the first slot may be a slot (e.g., K+1-th slot) subsequent to the last slot (e.g., K-th slot) including the SL resource allocated by the DCI.

Alternatively, in the above-described embodiment, a UE may omit correction by TA/2 in the SFN0 reference or the DCI reception reference. For example, when a UE uses a DL timing of the UE side, the UE may omit correction by TA/2 in the SFN0 reference or the DCI reception reference.

On the other hand, when a drx-HARQ-RTT-TimerSL expires and a HARQ feedback for a HARQ process and/or SL resource interval corresponding to the timer is NACK (For example, when a PSCCH/PSSCH receiving UE fails to decode a PSSCH from the corresponding SL resource), the drx-RetransmissionTimerSL operation may be (re)started for the corresponding HARQ process and/or SL resource interval, in the first symbol after the timer expires. More specifically, depending on an SL resource allocation scheme (e.g., dynamic grant or configured grant), the drx-RetransmissionTimerSL operation may be (re)started regardless of the conditions for HARQ feedback information. This may be a configured grant method, as the basis of this, this is because, when an active time is not extended, PDCCH transmission and reception for activation/deactivation of the configured SL resource may not be efficiently performed in the case of SL resource allocation in the configured grant method, since the UE may not use the resource. Through this, PDCCH reception for retransmission for SL resource allocation can be efficiently performed.

On the other hand, HARQ feedback report for SL transmission may be deactivated by DCI indication and/or RRC configuration from a base station. In this case, an RTT value (or the total operating time) for a case in which a HARQ feedback report is activated may be separately configured for a UE, the UE may operate a first timer (or drx-HARQ-RTT-TimerSL) for when HARQ feedback reporting is activated. For example, if HARQ feedback reporting is disabled, the UE may start an operation of a first timer (or drx-HARQ-RTT-TimerSL2) for a case in which HARQ feedback reporting is deactivated in the N-th symbol (N, for example, a natural number less than or equal to 14) after the corresponding SL resource interval.

In one example, drx-HARQ-RTT-TimerSL2 may be a different timer from drx-HARQ-RTT-TimerSL (or, a timer that is the same/similar (first) timer but has a different total operating time (or RTT)).

In another example, the total operating time (or RTT value) of the drx-HARQ-RTT-TimerSL may be determined as a first operating time, based on an inactivation of reporting to a base station of the sidelink HARQ feedback information. In this case, the first operating time may be different from a second operating time determined by the total operating time of the drx-HARQ-RTT-TimerSL, based on an activation of reporting of the sidelink HARQ feedback information to the base station. In one example, the first operating time may be shorter than the second operating time.

Or, for example, regardless of whether a HARQ feedback report is activated/deactivated, a UE may use the same drx-HARQ-RTT-TimerSL. For example, if a HARQ feedback report is deactivated after the RTT timer expires, the UE may (re)start a drx-RetransmissionTimerSL operation for the corresponding HARQ process and/or SL resource interval in the first symbol after the corresponding timer expires.

Meanwhile, when a DRX operation is configured, a UE may monitor a PDCCH only in an active time, and the active time may be a case in which the UE transmits a scheduling request (SR) and the corresponding SR is in a pending state. In the SR pending state, in the case of UL-SCH, the pending state is canceled when a UE transmits a buffer status report (BSR) or when the UL grant(s) can transmit all pending data, until then, the pending state may be maintained. Even during operation for SL resource allocation, a UE may transmit an SR to a base station, and in this case, the condition for the SR pending state needs to be defined. For example, an SR for the SL may be in a pending state until the BSR for the SL is transmitted to a base station, and may be in a canceled state thereafter. For example, in the case of SR for SL, if the amount of SL resources indicated by DCI is sufficient to send pending data from the perspective of the PSCCH/PSSCH transmitting UE that has received the DCI, the SR pending is canceled, until then, it is maintained as a pending state.

On the other hand, when a DRX operation is configured, a UE may be late in receiving a PDCCH indicating activation or deactivation of a configured SL resource. In this case, resource utilization may be inefficient in terms of network. As part of a method to alleviate inefficiencies in resource utilization, a UE may transmit a Scheduling Request (SR) to a base station to receive a PDCCH indicating activation and/or deactivation of a configured SL resource allocation. More specifically, the SR may be differentiated from an SR for SL resource allocation, and SR IDs may be different and/or PUCCH resources may be distinguished as a discrimination method.

On the other hand, in the next system, as part of a method for saving power consumption of a UE, during DRX operation, whether to actually receive a PDCCH in an ON duration may be indicated through a wake-up signal (WUS). More specifically, when actual traffic occurs or when the UE determines that reception of a PDCCH is necessary, the base station may transmit a wake-up signal before the on duration configured from the higher layer (e.g., the period in which drx-OnDurationTimer operates) and/or transmit an indicator to perform PDCCH monitoring in the on duration to the UE. On the other hand, when no traffic occurs or when it is determined that the UE does not need PDCCH reception, the base station may not transmit a wake-up signal before the On duration configured in the higher layer, or transmits a wake-up signal, but may transmit an indicator for not performing PDCCH monitoring to the UE. The UE may perform PDCCH monitoring in an On duration configured according to whether a weather signal is received and/or received indicator information, or may be in a sleep mode without performing PDCCH monitoring. Through this, a gain of minimizing UE power consumed for PDCCH monitoring may be generated according to whether or not actual traffic is generated. On the other hand, in the next system, a method of extending the micro sleep period of the UE by flexibly changing the minimum available values for K0 (PDCCH-to-PDSCH timing) and/or K2 (PDCCH-to-PUSCH timing), or lowering power consumption of the UE by lowering the clock speed may be introduced. In this case, in the case of a UE supporting SL mode 1 operation, the UE power consumption saving method can operate properly only by adjusting a minimum value suitable for PDCCH-to-first sidelink (SL) resource timing. On the other hand, when the minimum value for timing is always applied to a PDCCH for SL resource allocation in consideration of the power consumption above, the delay time for SL data may be unnecessarily increased.

For example, an exception may be placed so that the limit of the minimum usable value for K0/K2 is not applied at the PDCCH reception time for SL resource allocation. Or, for example, at the PDCCH reception time for SL resource allocation, the minimum usable value for K0/K2 can be replaced with a small value (based on absolute time) by comparing the limit value configured in the higher layer with the PDCCH-to-first SL resource timing. Alternatively, for example, the PDCCH-to-first SL resource timing value may also be limited in a time interval to which the minimum available value limit for K0/K2 is applied. As a more specific example, a limit value for PDCCH-to-first SL resource timing may be additionally configured in a higher layer. Whether to apply a limit value for PDCCH-to-first SL resource timing may be configured as an indicator in DCI format 0_1/1_1 and/or an indicator in DCI format for SL resource allocation.

Meanwhile, a DRX operation may also be supported for PSCCH and/or SCI monitoring. When it is assumed that only the NR sidelink mode 1 operation or only the in-coverage UE is supported for a specific resource pool, it may be considered that a base station manages a PSCCH and/or SCI monitoring period. For example, a base station may flexibly indicate slot information through which a PSCCH/PSSCH receiving UE will attempt PSCCH and/or SCI monitoring, through DCI. For example, a base station may indicate slot information in which a PSCCH/PSSCH receiving UE will attempt PSCCH and/or SCI monitoring through a Configured grant (higher layer signaling and/or DCI). More specifically, the DCI or configured grant information may be distinguished from DCI or configured grant indicated for PSCCH/PSSCH transmission, and as an example of the distinction, RNTI is different and/or DCI indicator and/or an indicator within higher layer signaling may be different. On the other hand, in a situation in which an NR sidelink mode 1 UE and a mode 2 UE coexist, or in a situation in which serving cells are different between the mode 1 UEs, the method may not be suitable, therefore, a base station can inform a UE whether the operation is possible through DCI or higher layer signaling.

Figure 15:
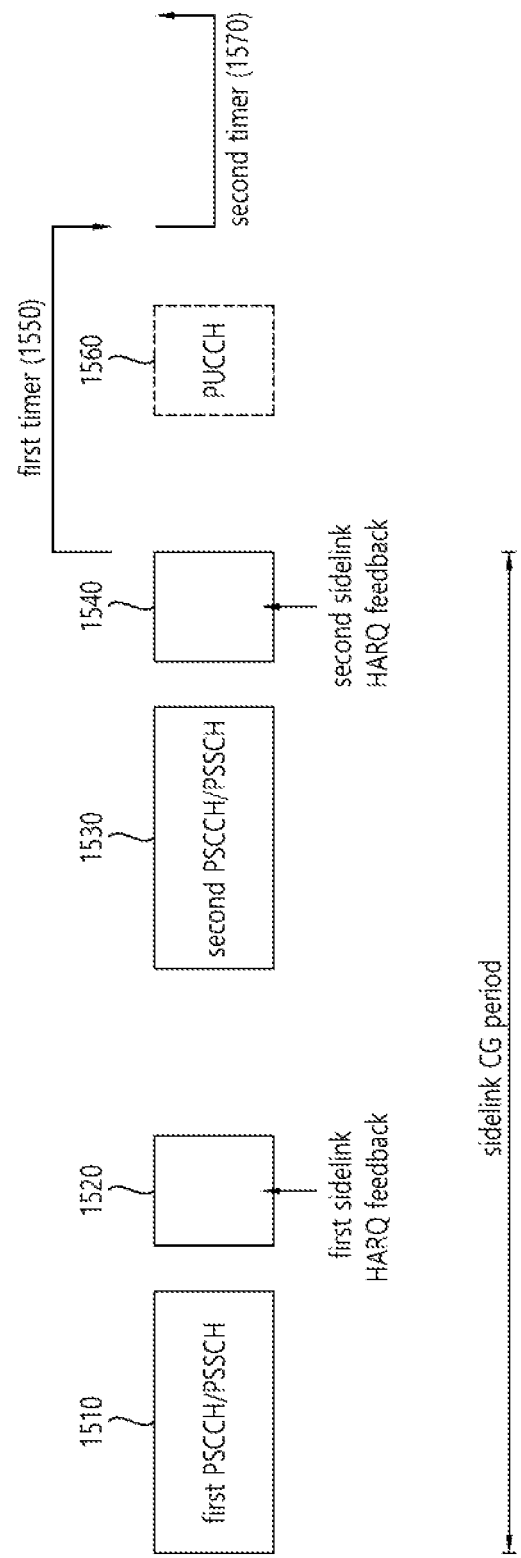
FIG. 15 shows an example in which a first timer and/or a second timer operate based on HARQ feedback, according to an embodiment of the present disclosure.

FIG. 15 shows an example in which a first timer and/or a second timer operate based on HARQ feedback, according to an embodiment of the present disclosure.

A first device according to an embodiment may transmit a first PSCCH/PSSCH 1510 to a second device. The first device may receive/determine a first sidelink HARQ feedback 1520 for the first PSSCH 1510. In one example, the first sidelink HARQ feedback 1520 may be a HARQ acknowledgment (ACK) or a HARQ negative acknowledgment (NACK).

Thereafter, the first device according to an embodiment may transmit a second PSCCH/PSSCH 1530 to the second device. The first device may receive/determine a second sidelink HARQ feedback 1540 for the second PSSCH 1530. In one example, the second sidelink HARQ feedback 1540 may be HARQ ACK or HARQ NACK.

Thereafter, a first device according to an embodiment may start a first timer 1550. While the first timer 1550 is running, a PSCCH and/or PSSCH may not be transmitted from the first device to the second device.

In one embodiment, when transmission of a Physical Uplink Control Channel (PUCCH, 1560) from the first device to a base station is activated, through the PUCCH 1560 while the first timer 1550 is running, the second sidelink HARQ feedback 1540 (and/or the first sidelink HARQ feedback 1520) may be reported to the base station.

In one embodiment, based on an inactivation of transmission of a PUCCH 1560 from the first device to the base station, the total operating time of the first timer 1550 may be determined as a first operating time, and based on an activation of transmission of a PUCCH 1560 from the first device to a base station, the total operating time of the first timer 1550 may be determined as a second operating time. The first operating time may be different from the second operating time. For example, the first operating time may be shorter than the second operating time.

In one embodiment, based on the second sidelink HARQ feedback information 1540 (and/or the first sidelink HARQ feedback information 1520) being HARQ negative acknowledgement (NACK) information representing that the second device has failed to decode data transmitted from the first device through the second PSSCH 1530, a second timer 1570 for retransmission from the first device to the second device may be started. The second timer 1570 may be started when the first timer 1550 expires or after the first timer 1550 expires.

A first device according to an embodiment may transmit the third PSCCH/PSSCH to the second device after the second timer 1570 is started. A transmission resource of the third PSCCH and/or the third PSSCH may be determined based on Downlink Control Information (DCI) received from a base station after the second timer 1570 is started.

In one embodiment, the first timer 1550 may be started after the end point of the time resource of the sidelink Configured Grant (CG) (period) related to the first PSCCH/PSSCH 1510, the first sidelink HARQ feedback 1520, the second PSCCH/PSSCH 1530, and the second sidelink HARQ feedback 1540.

In one example, the first timer 1550 may be started at the N-th symbol (N, for example, a natural number less than or equal to 14) after the end point of a time resource of the sidelink CG (period). For example, N may be 1.

In another embodiment, the first timer 1550 may be started after the end of the time resource for receiving the second sidelink HARQ feedback information 1540.

In another embodiment, the first timer 1550 may be started at the Nth symbol (N is, for example, a natural number less than or equal to 14) after the end of the time resource for receiving the second sidelink HARQ feedback information 1540. For example, the N may be 1.

In an embodiment, the first timer 1550 may be started based on reception/determination of the second sidelink HARQ feedback 1540 that is a sidelink HARQ feedback for a transmission of the second PSCCH/PSSCH 1530 that is the last PSCCH/PSSCH transmission in the sidelink CG period.

Figure 16:
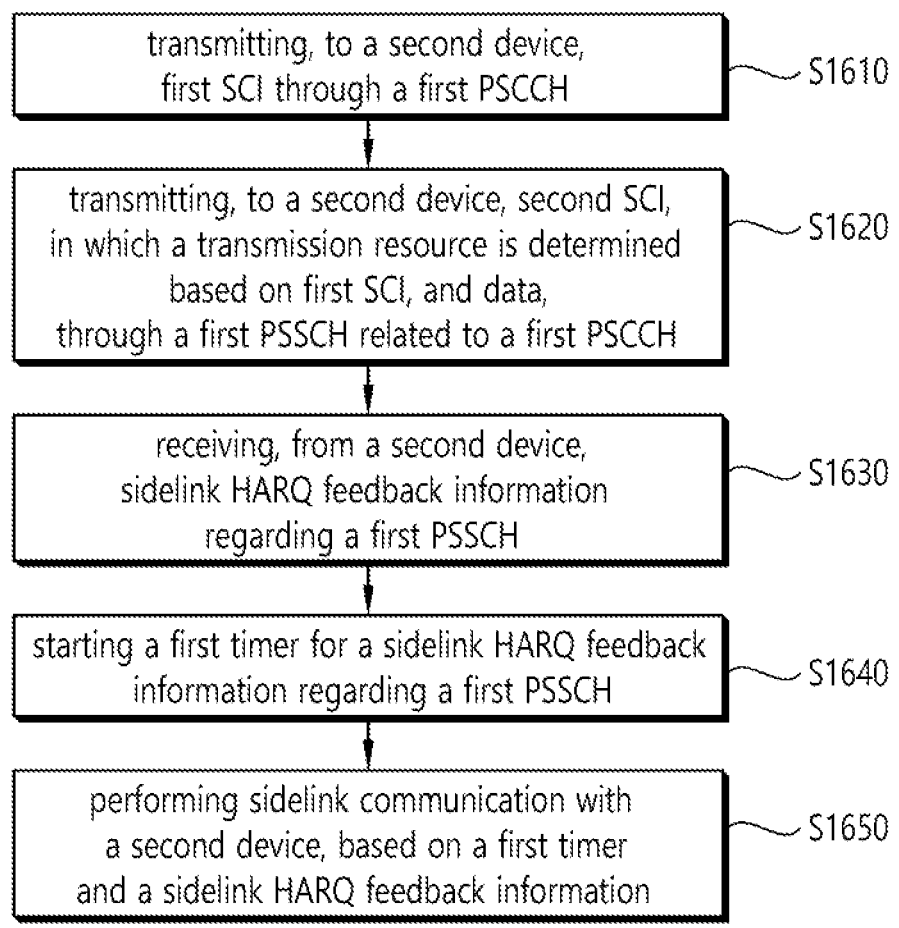
FIG. 16 is a flowchart showing an operation of a first device according to an embodiment of the present disclosure.

FIG. 16 is a flowchart showing an operation of a first device according to an embodiment of the present disclosure.

Operations disclosed in the flowchart of FIG. 16 may be performed in combination with various embodiments of the present disclosure. In one example, the operations disclosed in the flowchart of FIG. 16 may be performed based on at least one of the devices illustrated in FIGS. 18 to 23. In one example, a first device of FIG. 16 may correspond to a first wireless device 100 of FIG. 19 to be described later. In another example, a first device of FIG. 16 may correspond to a second wireless device 200 of FIG. 19 to be described later.

In step S1610, a first device according to an embodiment may transmit, to a second device, first sidelink control information (SCI) through a first physical sidelink control channel (PSCCH).

In step S1620, a first device according to an embodiment may transmit, to the second device, second SCI, in which a transmission resource is determined based on the first SCI, and data, through a first physical sidelink shared channel (PSSCH) related to the first PSCCH.

In step S1630, a first device according to an embodiment may receive, from the second device, sidelink hybrid automatic repeat request (HARQ) feedback information regarding the first PSSCH.

In step S1640, a first device according to an embodiment may start a first timer for the sidelink HARQ feedback information regarding the first PSSCH.

For example, the first timer may be the same as, similar to, or corresponding to drx-HARQ-RTT-TimerSL or drx-HARQ-RTT-TimerSL2 described above in FIG. 14.

In step S1650, a first device according to an embodiment may perform sidelink communication with the second device, based on the first timer and the sidelink HARQ feedback information.

In an embodiment, a second PSCCH different from the first PSCCH and a second PSSCH different from the first PSSCH may be not transmitted from the first device to the second device, based on the first timer running.

In an embodiment, total operating time of the first timer may be determined as first operating time, based on inactivation of a transmission of a physical uplink control channel (PUCCH) from the first device to a base station, the first operating time may be different from a second operating time determined as the total operating time of the first timer based on activation of the transmission of the PUCCH.

More specifically, HARQ feedback report for SL transmission may be deactivated by DCI indication and/or RRC configuration from a base station. At this time, an RTT value (or the total operating time) for the case in which a HARQ feedback report is activated may be separately configured for a UE, and the UE may operate a first timer (or drx-HARQ-RTT-TimerSL) for when HARQ feedback reporting is activated. For example, if HARQ feedback reporting is disabled, the UE may start an operation of a first timer (or drx-HARQ-RTT-TimerSL2) for a case in which HARQ feedback reporting is deactivated in the N-th symbol (N, for example, is a natural number less than or equal to 14) after the corresponding SL resource interval.

For example, drx-HARQ-RTT-TimerSL2 may be a timer different from drx-HARQ-RTT-TimerSL (or a timer that is the same/similar first timer but has a different total operating time (or RTT)).

In an embodiment, the sidelink HARQ feedback information may be transmitted from the first device to the base station through the PUCCH after the first timer is started and before expiration, based on the activation of the transmission of the PUCCH.

In an embodiment, the first operating time may be shorter than the second operating time.

In an embodiment, configuration information regarding the first timer may be received from a base station.

In an embodiment, the configuration information regarding the first timer may include information regarding total operating time of the first timer.

In an embodiment, a second timer for a retransmission from the first device to the second device may be started, based on the sidelink HARQ feedback information being HARQ negative acknowledgement (NACK) information representing that the second device has failed to decode data transmitted from the first device through the first PSSCH. the second timer may be started at a timer point at which the first timer expires or after the first timer expires.

For example, the second timer may be the same as, similar to, or corresponding to drx-RetransmissionTimerSL described above in FIG. 14.

In an embodiment, performing the sidelink communication with the second device may include, transmitting, to the second device, a third PSCCH and a third PSSCH related to the third PSCCH after the second timer is started.

In an embodiment, a transmission resource of the third PSCCH and the third PSSCH may be determined based on downlink control information (DCI) received from a base station after the second timer is started.

In an embodiment, the first timer may be started after an end point of a sidelink configured grant (CG) time resource related to the first PSCCH, the first PSSCH and the sidelink HARQ feedback information.

In an embodiment, the first timer may be started after an end point of a timer resource for a reception of the sidelink HARQ feedback information.

According to an embodiment of the present disclosure, a first device for performing sidelink communication may be proposed. The first device may comprise: one or more memories storing instructions; one or more transceivers; and one or more processors connected to the one or more memories and the one or more transceivers, wherein the one or more processors execute the instructions to: transmit, to a second device, first sidelink control information (SCI) through a first physical sidelink control channel (PSCCH); transmit, to the second device, second SCI, in which a transmission resource is determined based on the first SCI, and data, through a first physical sidelink shared channel (PSSCH) related to the first PSCCH; receive, from the second device, sidelink hybrid automatic repeat request (HARQ) feedback information regarding the first PSSCH; start a first timer for the sidelink HARQ feedback information regarding the first PSSCH; and perform sidelink communication with the second device, based on the first timer and the sidelink HARQ feedback information, wherein a second PSCCH different from the first PSCCH and a second PSSCH different from the first PSSCH are not transmitted from the first device to the second device, based on the first timer running.

According to an embodiment of the present disclosure, a device (or a chip(set)) configured to control a first user equipment (UE) may be proposed. The device may comprise: one or more processors; and one or more memories operably connectable to the one or more processors and storing instructions, wherein the one or more processors execute the instructions to: transmit, to a second UE, first sidelink control information (SCI) through a first physical sidelink control channel (PSCCH); transmit, to the second UE, second SCI, in which a transmission resource is determined based on the first SCI, and data, through a first physical sidelink shared channel (PSSCH) related to the first PSCCH; receive, from the second UE, sidelink hybrid automatic repeat request (HARQ) feedback information regarding the first PSSCH; start a first timer for the sidelink HARQ feedback information regarding the first PSSCH; and perform sidelink communication with the second UE, based on the first timer and the sidelink HARQ feedback information, wherein a second PSCCH different from the first PSCCH and a second PSSCH different from the first PSSCH are not transmitted from the first UE to the second UE, based on the first timer running.

According to an embodiment of the present disclosure, a non-transitory computer-readable storage medium storing instructions may be proposed. The instructions, when executed, may cause a first device to: transmit, to a second device, first sidelink control information (SCI) through a first physical sidelink control channel (PSCCH); transmit, to the second device, second SCI, in which a transmission resource is determined based on the first SCI, and data, through a first physical sidelink shared channel (PSSCH) related to the first PSCCH; receive, from the second device, sidelink hybrid automatic repeat request (HARQ) feedback information regarding the first PSSCH; start a first timer for the sidelink HARQ feedback information regarding the first PSSCH; and perform sidelink communication with the second device, based on the first timer and the sidelink HARQ feedback information, wherein a second PSCCH different from the first PSCCH and a second PSSCH different from the first PSSCH are not transmitted from the first device to the second device, based on the first timer running.

For example, the first UE in the above embodiment may refer to a first device described in the first half of the present disclosure. For example, each of the at least one processor and the at least one memory in the device for controlling the first UE may be implemented as a separate sub chip, or at least two or more components may be implemented through one sub-chip.

Figure 17:
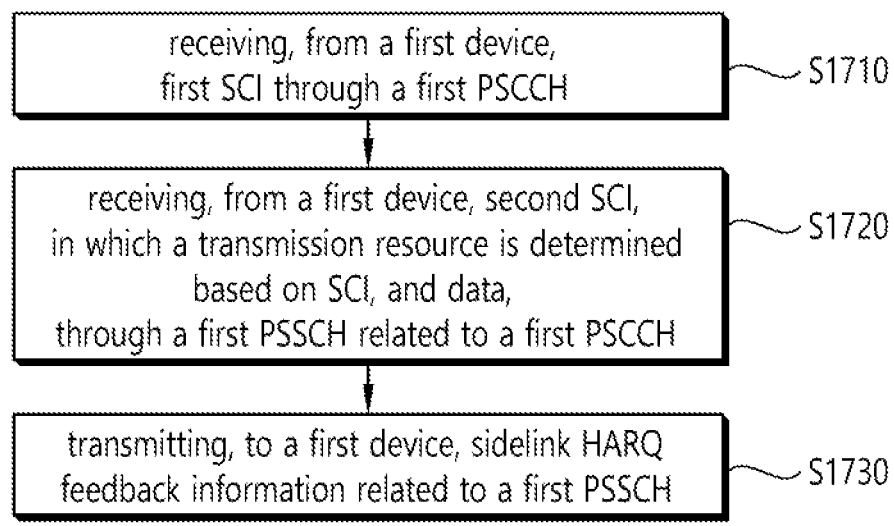
FIG. 17 is a flowchart showing an operation of a second device according to an embodiment of the present disclosure.

FIG. 17 is a flowchart showing an operation of a second device according to an embodiment of the present disclosure.

Operations disclosed in the flowchart of FIG. 17 may be performed in combination with various embodiments of the present disclosure. For example, operations disclosed in the flowchart of FIG. 17 may be performed based on at least one of devices illustrated in FIGS. 18 to 23. For example, a second device of FIG. 17 may correspond to a second wireless device 200 of FIG. 19 to be described later. For another example, a second device of FIG. 17 may correspond to a first wireless device 100 of FIG. 19 which will be described later.

In step S1710, a second device according to an embodiment may receive, from a first device, first sidelink control information (SCI) through a first physical sidelink control channel (PSCCH).

In step S1720, a second device according to an embodiment may receive, from the first device, second SCI, in which a transmission resource is determined based on the SCI, and data, through a first physical sidelink shared channel (PSSCH) related to the first PSCCH.

In step S1730, a second device according to an embodiment may transmit, to the first device, sidelink hybrid automatic repeat request (HARQ) feedback information related to the first PSSCH.

In an embodiment, a second PSCCH different from the first PSCCH and a second PSSCH different from the first PSSCH may be not transmitted from the first device to the second device, based on the first timer running.

In an embodiment, total operating time of the first timer may be determined as first operating time, based on inactivation of a transmission of a physical uplink control channel (PUCCH) from the first device to a base station. In this case, the first operating time may be different from a second operating time determined as the total operating time of the first timer based on activation of the transmission of the PUCCH.

ARQ feedback report for SL transmission may be deactivated by DCI indication and/or RRC configuration from a base station. At this time, an RTT value (or the total operating time) for the case in which a HARQ feedback report is activated may be separately configured for a UE, and the UE may operate a first timer (or drx-HARQ-RTT-TimerSL) for when HARQ feedback reporting is activated. For example, if HARQ feedback reporting is disabled, the UE may start an operation of a first timer (or drx-HARQ-RTT-TimerSL2) for a case in which HARQ feedback reporting is deactivated in the N-th symbol (N, for example, is a natural number less than or equal to 14) after the corresponding SL resource interval.

For example, drx-HARQ-RTT-TimerSL2 may be a timer different from drx-HARQ-RTT-TimerSL (or a timer that is the same/similar first timer but has a different total operating time (or RTT)).

In an embodiment, the sidelink HARQ feedback information may be transmitted from the first device to the base station through the PUCCH after the first timer is started and before expiration, based on the activation of the transmission of the PUCCH.

In an embodiment, the first operating time may be shorter than the second operating time.

In an embodiment, configuration information regarding the first timer may be received from a base station.

In an embodiment, the configuration information regarding the first timer may include information regarding total operating time of the first timer.

In an embodiment, a second timer for a retransmission from the first device to the second device may be started, based on the sidelink HARQ feedback information being HARQ negative acknowledgement (NACK) information representing that the second device has failed to decode data transmitted from the first device through the first PSSCH. the second timer may be started at a timer point at which the first timer expires or after the first timer expires.

For example, the second timer may be the same as, similar to, or corresponding to drx-RetransmissionTimerSL described above in FIG. 14.

In an embodiment, performing the sidelink communication with the second device may include, transmitting, to the second device, a third PSCCH and a third PSSCH related to the third PSCCH after the second timer is started.

In an embodiment, a transmission resource of the third PSCCH and the third PSSCH may be determined based on downlink control information (DCI) received from a base station after the second timer is started.

In an embodiment, the first timer may be started after an end point of a sidelink configured grant (CG) time resource related to the first PSCCH, the first PSSCH and the sidelink HARQ feedback information.

In an embodiment, the first timer may be started after an end point of a timer resource for a reception of the sidelink HARQ feedback information.

According to an embodiment of the present disclosure, a second device for performing sidelink communication may be proposed. The second device may comprise: one or more memories storing instructions; one or more transceivers; and one or more processors connected to the one or more memories and the one or more transceivers, wherein the one or more processors execute the instructions to: receive, from a first device, first sidelink control information (SCI) through a first physical sidelink control channel (PSCCH); receive, from the first device, second SCI, in which a transmission resource is determined based on the SCI, and data, through a first physical sidelink shared channel (PSSCH) related to the first PSCCH; and transmit, to the first device, sidelink hybrid automatic repeat request (HARQ) feedback information related to the first PSSCH, wherein a second PSCCH different from the first PSCCH and a second PSSCH different from the first PSSCH are not transmitted from the first device to the second device, based on the first timer running.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
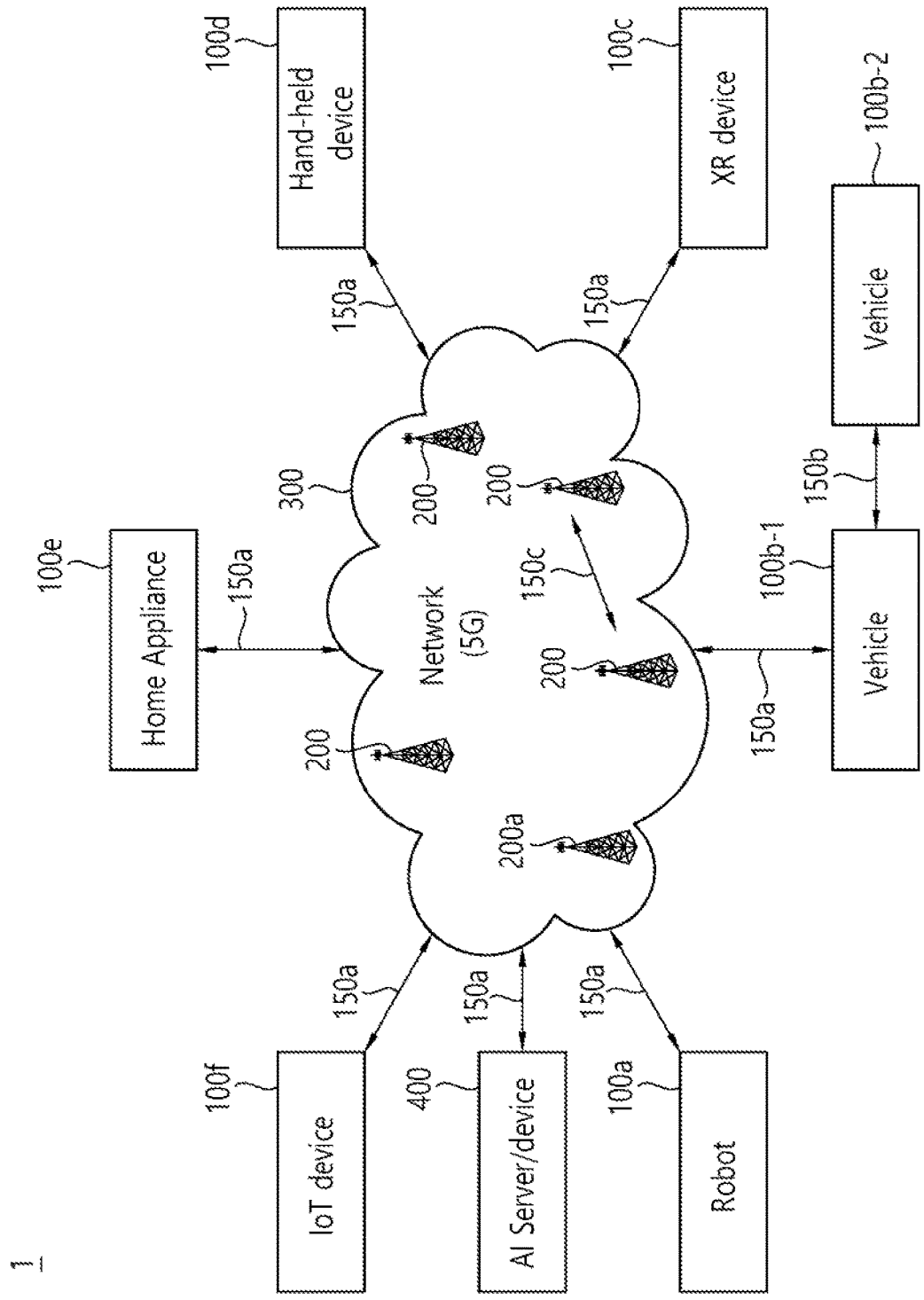
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
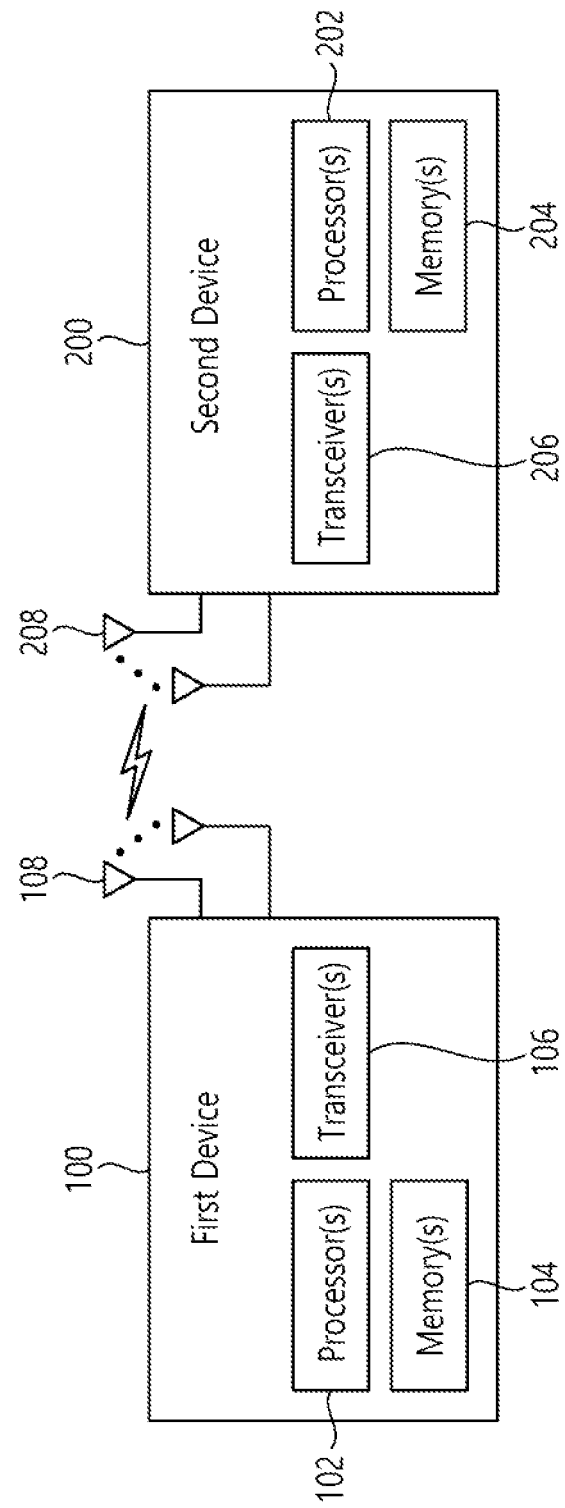
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
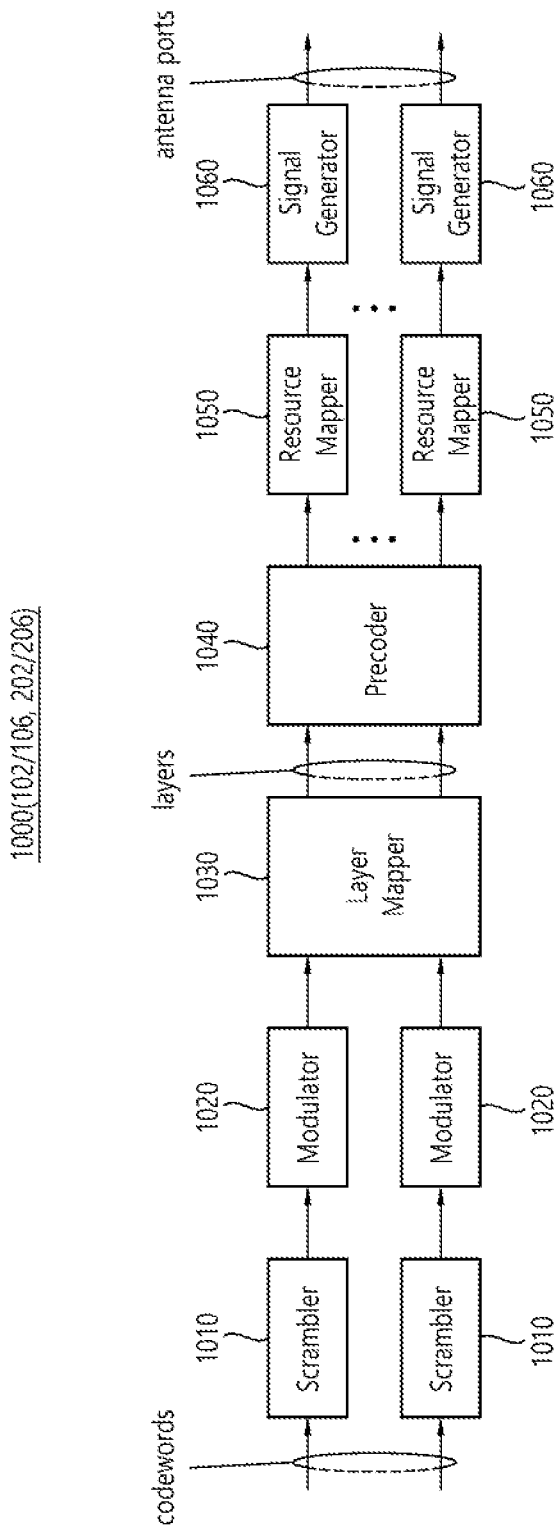
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
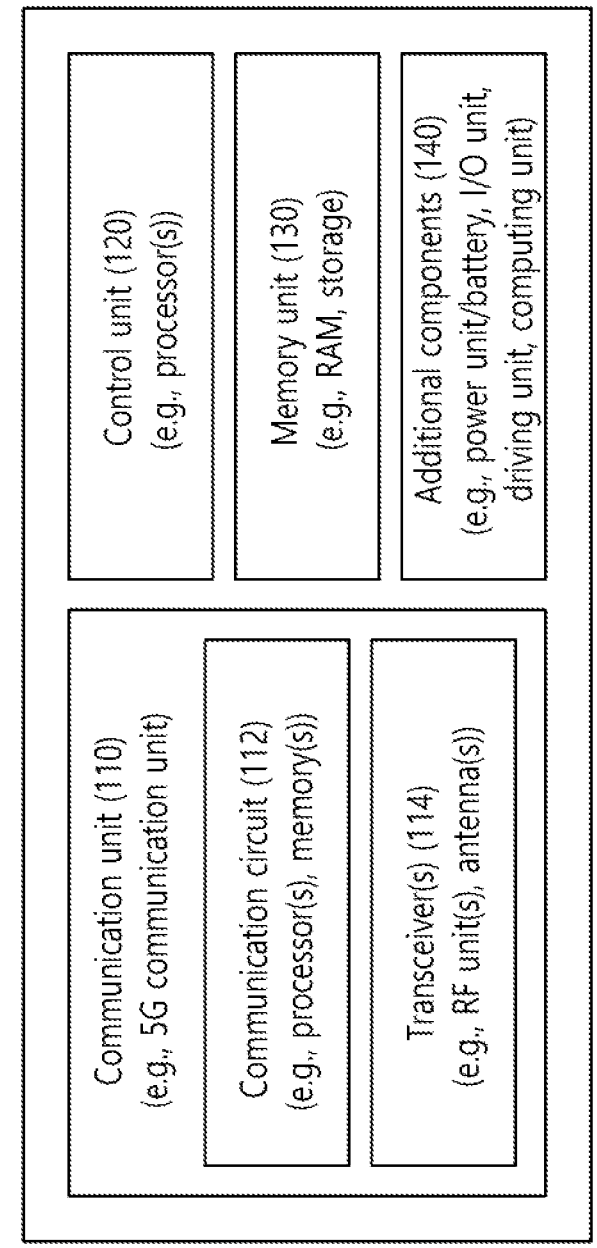
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
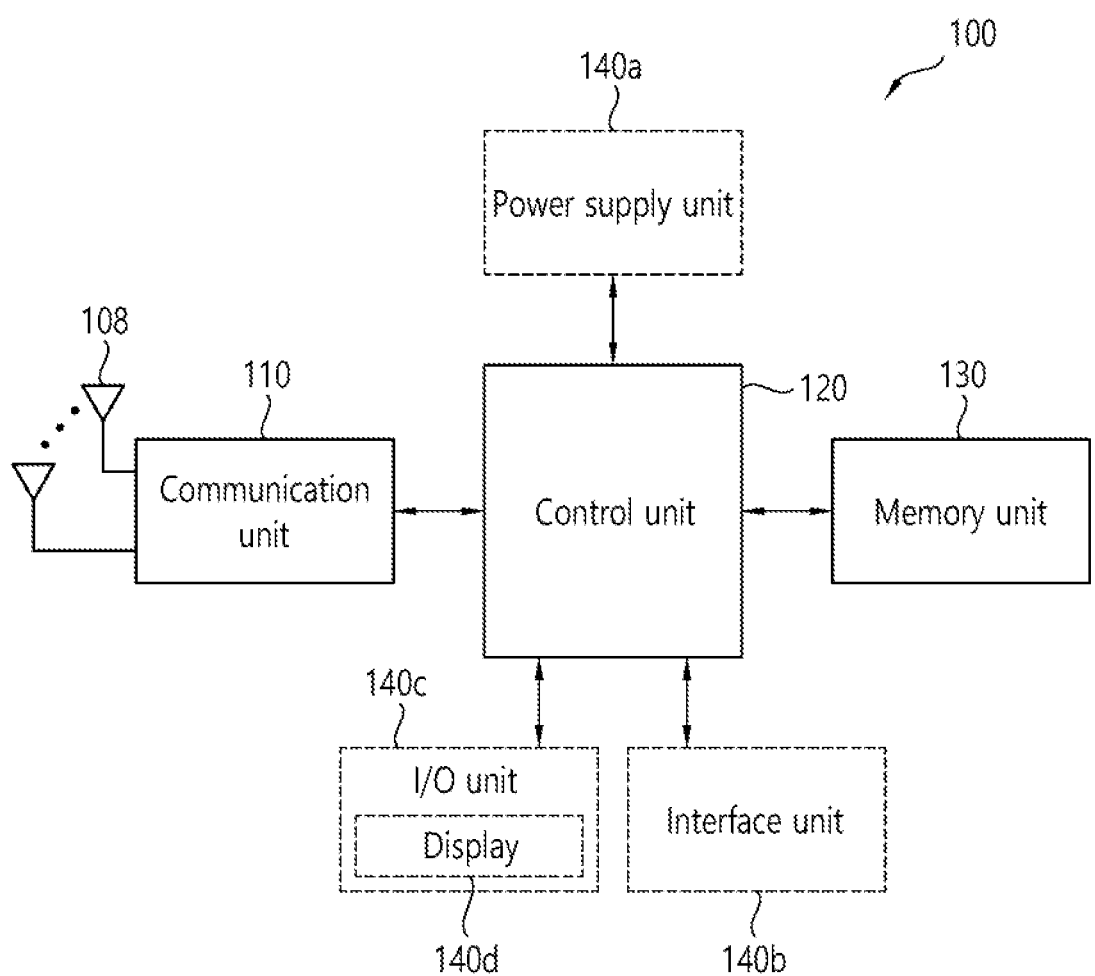
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
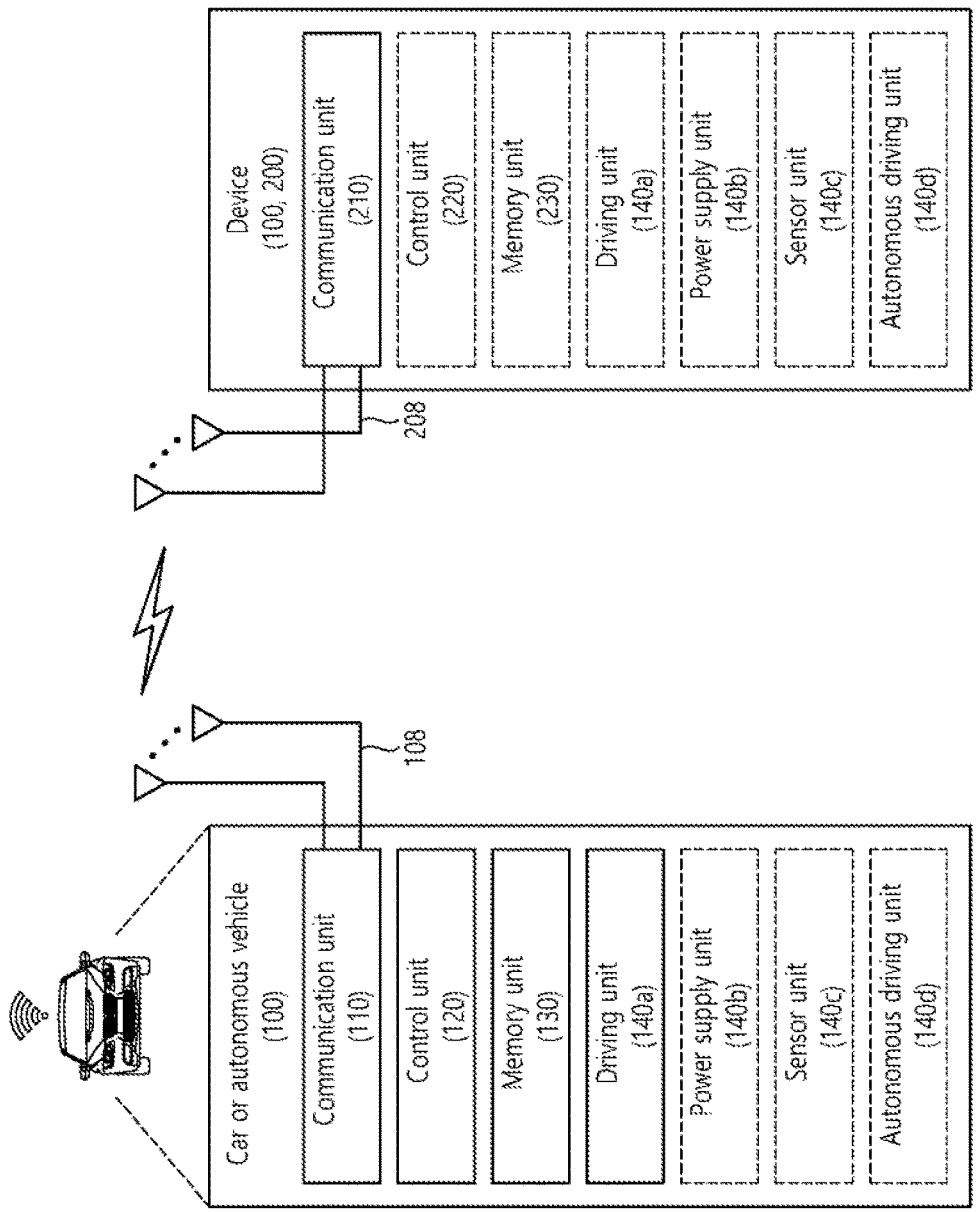
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an device, and technical features in device claims can be combined to be implemented or performed in a method. Further, technical features in method claim(s) and device claim(s) can be combined to be implemented or performed in an device. Further, technical features in method claim(s) and device claim(s) can be combined to be implemented or performed in a method.

What is claimed is:

1. A method comprising:
transmitting, by a first device, to a second device, first sidelink control information through a first physical sidelink control channel;
transmitting, by the first device, to the second device, second sidelink control information and data, through a first physical sidelink shared channel related to the first physical sidelink control channel;
receiving, by the first device, from the second device, sidelink hybrid automatic repeat request feedback information regarding the first physical sidelink shared channel; and
starting, by the first device, a sidelink discontinuous reception hybrid automatic repeat request round trip time timer for the sidelink hybrid automatic repeat request feedback information regarding the first physical sidelink shared channel,
wherein a first length of the sidelink discontinuous reception hybrid automatic repeat request round trip time timer, which is determined based on deactivation of a transmission of a physical uplink control channel, is different from a second length of the sidelink discontinuous reception hybrid automatic repeat request round trip time timer, which is determined based on activation of the transmission of the physical uplink control channel.

2. The method of claim 1, wherein the sidelink hybrid automatic repeat request feedback information is transmitted from the first device to a base station through the physical uplink control channel after the sidelink discontinuous reception hybrid automatic repeat request round trip time timer is started and before expiration, based on the activation of the transmission of the physical uplink control channel.

3. The method of claim 1, wherein the first length is shorter than the second length.

4. The method of claim 1, wherein configuration information regarding the sidelink discontinuous reception hybrid automatic repeat request round trip time timer is received from a base station.

5. The method of claim 4, wherein the configuration information regarding the sidelink discontinuous reception hybrid automatic repeat request round trip time timer includes information regarding the first length or the second length of the sidelink discontinuous reception hybrid automatic repeat request round trip time timer.

6. The method of claim 1, wherein a sidelink discontinuous reception retransmission timer for a retransmission from the first device to the second device is started, based on the sidelink hybrid automatic repeat request feedback information being hybrid automatic repeat request negative acknowledgement information representing that the second device has failed to decode data transmitted from the first device through the first physical sidelink shared channel,
wherein the sidelink discontinuous reception retransmission timer is started at a timer point at which the sidelink discontinuous reception hybrid automatic repeat request round trip time timer expires or after the sidelink discontinuous reception hybrid automatic repeat request round trip time timer expires.

7. The method of claim 6, further comprising performing sidelink communication with the second device including:
transmitting, to the second device, a third physical sidelink control channel and a third physical sidelink shared channel related to the third physical sidelink control channel after the sidelink discontinuous reception retransmission timer is started.

8. The method of claim 7, wherein a transmission resource of the third physical sidelink control channel and the third physical sidelink shared channel is determined based on downlink control information received from a base station after the sidelink discontinuous reception retransmission timer is started.

9. The method of claim 1, wherein the sidelink discontinuous reception hybrid automatic repeat request round trip time timer is started after an end point of a sidelink configured grant time resource related to the first physical sidelink control channel, the first physical sidelink shared channel and the sidelink hybrid automatic repeat request feedback information.

10. The method of claim 1, wherein the sidelink discontinuous reception hybrid automatic repeat request round trip time timer is started after an end point of a timer resource for a reception of the sidelink hybrid automatic repeat request feedback information.

11. The method of claim 1, wherein a second physical sidelink control channel different from the first physical sidelink control channel and a second physical sidelink shared channel different from the first physical sidelink shared channel are not transmitted from the first device to the second device, while the sidelink discontinuous reception hybrid automatic repeat request round trip time timer is running.

12. A first device comprising:
at least one transceiver;
at least one processor; and
at least one memory connected to the at least one processor and storing instructions that, based on being executed, cause the first device to perform operations comprising:
transmitting, to a second device, first sidelink control information through a first physical sidelink control channel;
transmitting, to the second device, second sidelink control information and data, through a first physical sidelink shared channel related to the first physical sidelink control channel;
receiving, from the second device, sidelink hybrid automatic repeat request feedback information regarding the first physical sidelink shared channel; and
starting a sidelink discontinuous reception hybrid automatic repeat request round trip time timer for the sidelink hybrid automatic repeat request feedback information regarding the first physical sidelink shared channel,
wherein a first length of the sidelink discontinuous reception hybrid automatic repeat request round trip time timer, which is determined based on deactivation of a transmission of a physical uplink control channel, is different from a second length of the sidelink discontinuous reception hybrid automatic repeat request round trip time timer, which is determined based on activation of the transmission of the physical uplink control channel.

13. A device configured to control a first user equipment, the device comprising:
- at least one processor; and
- at least one memory connected to the at least one processor and storing instructions that, based on being executed, cause the first user equipment to perform operations comprising:
- transmitting, to a second user equipment, first sidelink control information through a first physical sidelink control channel;
- transmitting, to the second user equipment, second sidelink control information and data, through a first physical sidelink shared channel related to the first physical sidelink control channel;
- receiving, from the second user equipment, sidelink hybrid automatic repeat request feedback information regarding the first physical sidelink shared channel; and
- starting a sidelink discontinuous reception hybrid automatic repeat request round trip time timer for the sidelink hybrid automatic repeat request feedback information regarding the first physical sidelink shared channel,
- wherein a first length of the sidelink discontinuous reception hybrid automatic repeat request round trip time timer, which is determined based on deactivation of a transmission of a physical uplink control channel, is different from a second length of the sidelink discontinuous reception hybrid automatic repeat request round trip time timer, which is determined based on activation of the transmission of the physical uplink control channel.

* * * * *